(12) United States Patent
Sakura et al.

(10) Patent No.: US 8,233,186 B2
(45) Date of Patent: Jul. 31, 2012

(54) PRINT DATA PROCESSING APPARATUS, PRINTER, PHOTOGRAPH VENDING MACHINE, AND PRINT DATA PROCESSING METHOD AND PROGRAM

(75) Inventors: Kohei Sakura, Kanagawa (JP); Toshiyuki Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1114 days.

(21) Appl. No.: 11/145,600

(22) Filed: Jun. 6, 2005

(65) Prior Publication Data

US 2005/0280840 A1 Dec. 22, 2005

(30) Foreign Application Priority Data

Jun. 7, 2004 (JP) ................................. 2004-169080
Jun. 7, 2004 (JP) ................................. 2004-169081
Jun. 7, 2004 (JP) ................................. 2004-169082

(51) Int. Cl.
G06K 15/02 (2006.01)
(52) U.S. Cl. ...................................................... 358/1.2
(58) Field of Classification Search .................. 358/1.2, 358/1.15
See application file for complete search history.

(56) References Cited

U.S. PATENT DOCUMENTS

| | | | | | |
|---|---|---|---|---|---|
| 5,574,831 | A | * | 11/1996 | Grenda | 358/1.4 |
| 6,657,702 | B1 | * | 12/2003 | Chui et al. | 355/40 |
| 2002/0186382 | A1 | * | 12/2002 | Gonzalez et al. | 358/1.2 |
| 2003/0050842 | A1 | * | 3/2003 | Wada et al. | 705/16 |
| 2003/0200308 | A1 | * | 10/2003 | Tameda et al. | 709/224 |
| 2004/0119990 | A1 | * | 6/2004 | Miller et al. | 358/1.2 |

FOREIGN PATENT DOCUMENTS

| | | |
|---|---|---|
| JP | 3 51961 | 3/1991 |
| JP | 6 243007 | 9/1994 |
| JP | 7 28801 | 1/1995 |
| JP | 8 36585 | 2/1996 |
| JP | 9 6557 | 1/1997 |
| JP | 9 146721 | 6/1997 |
| JP | 10 333844 | 12/1998 |
| JP | 11 184649 | 7/1999 |
| JP | 2000 112685 | 4/2000 |
| JP | 2001 92641 | 4/2001 |
| JP | 2001 162898 | 6/2001 |
| JP | 2002 19244 | 1/2002 |
| JP | 2003 57763 | 2/2003 |
| JP | 2003 118210 | 4/2003 |
| JP | 2003-167709 | * 6/2003 |
| JP | 2004 5455 | 1/2004 |
| JP | 2004 70521 | 3/2004 |

* cited by examiner

*Primary Examiner* — Benny Q Tieu
*Assistant Examiner* — Jeremiah Bryar
(74) *Attorney, Agent, or Firm* — Frommer Lawrence & Haug LLP; William S. Frommer; Ellen Marcie Emas

(57) ABSTRACT

A print data processing apparatus includes a reception processing unit receiving an instruction for execution of a multi-size printing function to output a piece of print data in a plurality of print sizes.

30 Claims, 27 Drawing Sheets

PRINT DATA PROCESSING APPARATUS, PRINTER, PHOTOGRAPH VENDING MACHINE, AND PRINT DATA PROCESSING METHOD AND PROGRAM

CROSS REFERENCES TO RELATED APPLICATIONS

The present invention claims priority from Japanese Patent Application JP 2004-169080, 2004-169081, and 2004-169082 filed in the Japanese Patent Office on Jun. 7, 2004, the entire contents of which are incorporated herein by reference.

BACKGROUND OF THE INVENTION

1. Field of the Invention

The present invention relates to print data processing apparatuses, printers, photograph vending machines, print data processing methods, and programs for performing the print data processing methods.

2. Description of the Related Art

Various types of printers are available depending on the purpose and use. Self-service photograph vending machines (hereinafter, referred to as kiosk terminals), which are one type of business printer, will be described below.

Kiosk terminals, which are apparatuses used by users to readily print digital images, are located in stores and the like.

Kiosk terminals perform printing processing roughly based on the procedure described below. First, a user inserts a user-carried recording medium into a reader. The kiosk terminal reads image data from the recording medium, and presents the image data in a thumbnail format. The user selects an image to be printed from among the presented thumbnail images, and designates the number of copies to be output. The number of copies to be output and the print size can be adjusted for each image. Then, the user inserts money, and a photograph is output from the kiosk terminal (see Japanese Unexamined Patent Application Publication No. 2003-118210).

When using existing kiosk terminals, in order to output an image in a plurality of print sizes, for example, in order to print an image in an L size (8.9 cm×12.7 cm) and in a KG size, that is, a postcard size (10.2 cm×15.2 cm), users make an order for each print size.

For example, after ordering printing in the L size, users order printing in the postcard size again. This is because the existing kiosk terminals can receive an order for printing an image in only one print size.

Thus, when users want to print an image in a plurality of print sizes, the users do not see, in a single printing-instruction reception operation, the total number of copies to be output.

An apparatus disclosed, for example, in Japanese Unexamined Patent Application Publication No. 2003-118210 also sets the number of copies to be output and the print size for each image. Thus, in order to output an image in a plurality of print sizes, orders are made separately.

As disclosed, for example, in Japanese Unexamined Patent Application Publication No. 2003-118210, existing kiosk terminals adopt a control procedure for assigning a piece of image data to a printer device and for waiting until completion of the printing before assigning the next piece of image data to a printer device.

Thus, even if a printing system deals with a plurality of print sizes, printing in another print size is not started until printing in a first print size is completed.

In this case, when a user desires printing in a plurality of print sizes, the total print time is calculated by adding print times for the plurality of print sizes. Thus, the total print time is increased.

In addition, when a plurality of users desire printing in different print sizes, printing for the next user is not started until printing for one user is completed. Thus, a waiting time is increased.

As described above, further improvement in the usability of existing kiosk terminals is possible. In addition, since existing control procedures do not effectively utilize the resources of printing systems, the control procedures should be improved in terms of operating efficiency.

In actual circumstances, printing may not be started immediately after receiving a printing instruction. For example, printing is not started if a paper size of a printing system is not equal to a print size designated by a user, if paper to be fed is in short supply, if ink is in short supply, if a fault occurs in a printer device, or the like.

Since existing kiosk terminals do not have a function to present to users the features supported by the printing system when receiving a printing instruction, users do not know whether or not printing can be immediately started until an error notification is received after the instruction for execution is given.

This problem occurs not only when kiosk terminals perform printing processing but also when printing apparatuses are used for other purposes.

SUMMARY OF THE INVENTION

The present assignee focuses attention on the above-mentioned technical problems, and proposes the technology described below.

In other words, the present assignee proposes a procedure for receiving an instruction for execution of a multi-size printing function to output a piece of print data in a plurality of print sizes when a printing instruction is received.

Here, low-resolution image data generated or stored for confirming the content is included in the "print data" received as an object to be printed.

In addition, the present assignee proposes a procedure in which, when print data is output to a printing system constituted by a plurality of printer devices prepared for respective print sizes, (a) it is determined whether or not multi-size printing is set for each piece of print data and (b) if multi-size printing is set, the respective pieces of print data are output to the respective printer devices in parallel.

In addition, the present assignee proposes a procedure in which, when a printing instruction is received, (a) information on a paper size that can be used when the printing instruction is received from among all the paper sizes handled by the printing system is acquired from the printing system and (b) a paper size that can be selected when the printing instruction is received is explicitly presented in accordance with the information on the paper size acquired from the printing system.

DESCRIPTION OF THE PREFERRED EMBODIMENTS

A printing-instruction reception apparatus according to a first embodiment of the present invention will be described.

Well-known or publicly known technologies in the art are applied to parts that are not particularly illustrated or described in this specification.

In addition, the first embodiment described below is merely an embodiment of the present invention. Thus, the present invention is not limited to this.

First Embodiment

Figure 1:
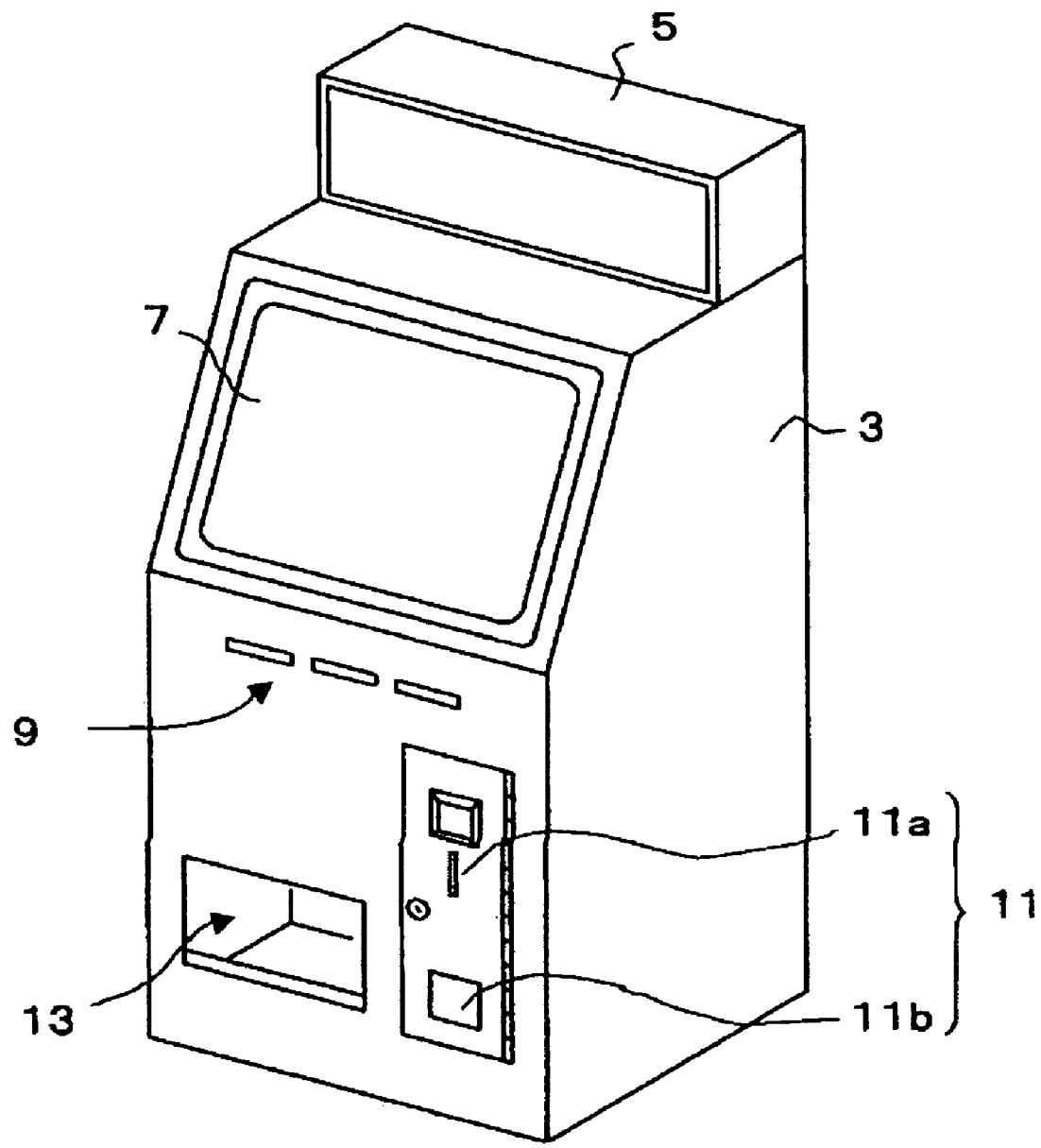
FIG. 1 shows an example of the appearance of a kiosk terminal.

FIG. 1 shows the appearance of a kiosk terminal 1. The kiosk terminal 1 is installed in theme parks, tourist sites, shops, and other commercial facilities.

An advertising display device 5 is provided on the top of a casing 3. The advertising display device 5 is, for example, a light-emitting diode (LED) bulletin board.

A display input device 7 is provided on the upper front of the casing 3. The display input device 7 is, for example, a touch-panel display device. When a user touches a region on a touch panel, selections and instructions are input. An operation procedure is displayed on the display input device 7.

Loading slots 9 for memory cards are provided on the center front of the casing 3. Memory cards are card-type storage units in which semiconductor memories or the like are used as recording media. Since memory cards are available in various specifications, the loading slots 9 in the first embodiment are of a plurality of types corresponding to various specifications.

A money reception device 11 is provided on the lower front of the casing 3. The money reception device 11 includes a coin slot 11a and a coin return 11b.

A photograph ejector 13 is also provided on the lower front of the casing 3. A printed photograph is ejected at the photograph ejector 13. The user can take the printed photograph by putting his or her hand into the photograph ejector 13.

Figure 2:
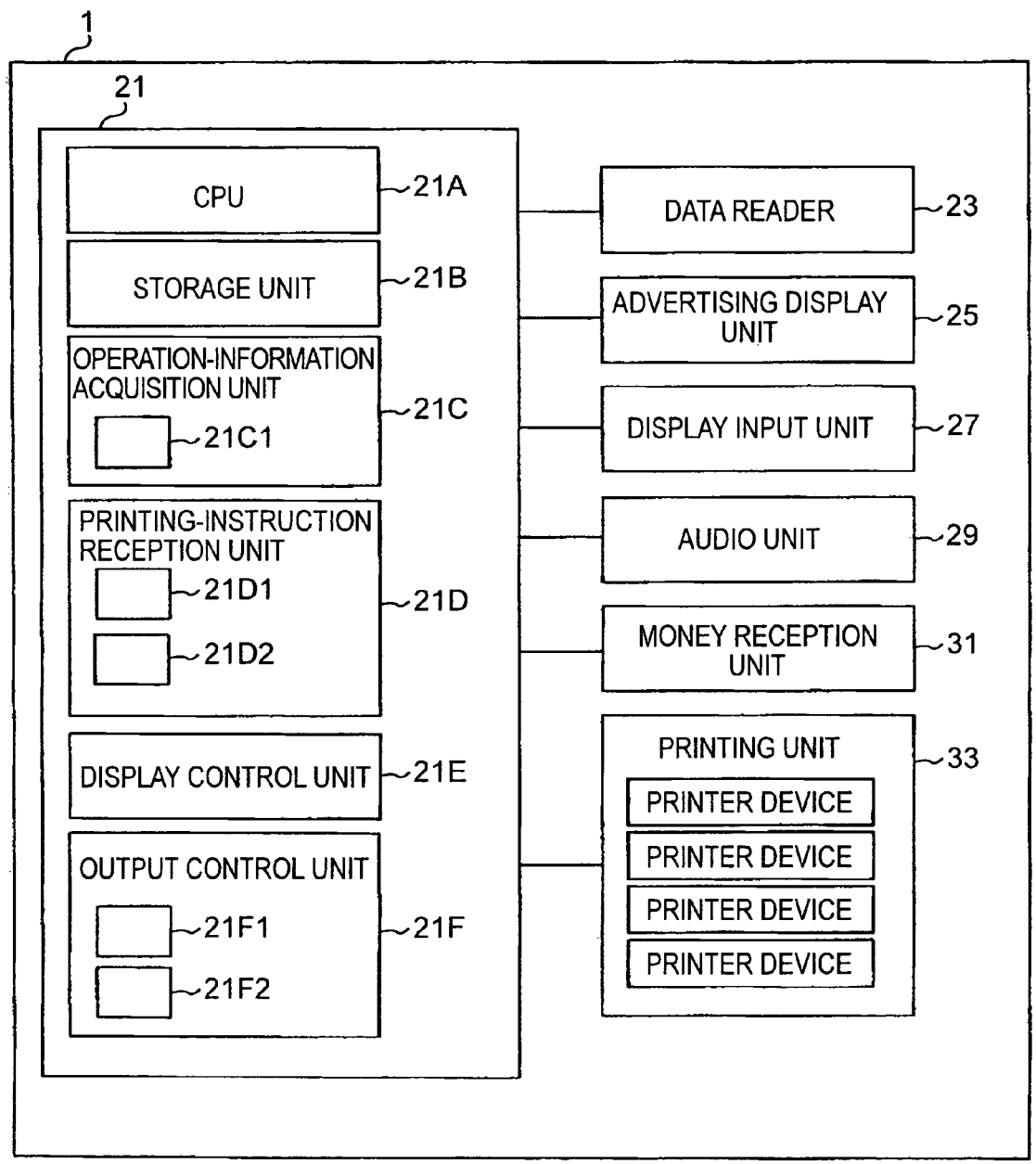
FIG. 2 shows an example of the internal structure of the kiosk terminal.

FIG. 2 shows an example of the internal structure of the kiosk terminal 1. The kiosk terminal 1 includes a controller 21, a data reader 23, an advertising display unit 25, a display input unit 27, an audio unit 29, a money reception unit 31, and a printing unit 33.

The controller 21 controls the operation from reception of image data to execution of printing. This control operation includes displaying various confirmation screens for users.

The controller 21 mainly includes a central processing unit (CPU) 21A, a storage unit 21B, an operation-information acquisition unit 21C, a printing-instruction reception unit 21D, a display control unit 21E, and an output control unit 21F.

The storage unit 21B is constituted by a read-only memory (ROM), a random-access memory (RAM), and a hard disk drive. The ROM is used for storing firmware, and the RAM is used for temporary storage and operation. The hard disk drive is used for storing image data.

The operation-information acquisition unit 21C acquires operation information of the printing unit 33 and presents the operation information to users. The operation-information acquisition unit 21C in the first embodiment includes a size-information acquisition part 21C1.

The size-information acquisition part 21C1 acquires information on paper sizes that can be used in accordance with paper sizes that can be handled by respective printer devices constituting the printing unit 33.

The printing-instruction reception unit 21D performs reception processing of a printing instruction given by users.

In the first embodiment, the printing-instruction reception unit 21D receives an instruction for execution of a function to print an image in a plurality of print sizes as well as an instruction for execution of a function to print an image in a single print size.

In this specification, the function to print an image in a plurality of print sizes is referred to as a "multi-size printing function". The printing-instruction reception unit 21D includes a multi-size printing-instruction reception part 21D1.

The printing-instruction reception unit 21D also includes a size-information presentation part 21D2. The size-information presentation part 21D2 explicitly presents to users paper sizes that can be used when the printing instruction is received from among all the paper sizes handled by the printing unit 33. In the first embodiment, a procedure is adopted in which only paper sizes that can be used are presented to users as candidates to be selected.

The display control unit 21E controls the content to be displayed on the display input unit 27 in association with the reception function of the printing-instruction reception unit 21D. For example, the display control unit 21E presents text-based information or thumbnail information.

The output control unit 21F controls image data being output to printer devices constituting the printing unit 33. The basic processing operation of the output control unit 21F is to reserve image data for a print queue of a printer device corresponding to a print size.

The output control unit 21F in the first embodiment includes a multi-size-printing determination part 21F1. The multi-size-printing determination part 21F1 determines whether or not multi-size printing is set for image data to be printed.

The output control unit 21F also includes a data distributing part 21F2 for reserving image data for a corresponding print queue.

The data reader 23 reads image data from a memory card inserted in the corresponding loading slot 9. The image data read from the data reader 23 is stored in the storage unit 21B.

The advertising display unit 25 selectively turns on and turns off an LED in accordance with, for example, a predetermined pattern.

The display input unit 27 includes a display device for displaying various confirmation screens for giving instructions to users or urging users to perform an operation and an input device for reporting to the controller 21 an operation on the touch panel.

The audio unit 29 outputs instructions or operations for users as sound. The audio unit 29 includes an audio circuit and a speaker.

The money reception unit 31 receives money required for printing. The money reception unit 31 includes an existing circuit and a mechanism used for money reception and money return.

The printing unit 33 includes a plurality of printer devices for printing image data on printing paper.

In the first embodiment, a plurality of dye-sublimation printer devices is used. The plurality of printer devices is arranged based on the print size. For example, four printer devices, that is, a printer device corresponding to 3.5 inch×5 inch size (that is, L-size), a printer device corresponding to 4 inch×6 inch size (that is, a postcard size), a printer device corresponding to 5 inch×7 inch size (that is, double-L size), and a printer device corresponding to 8 inch×10 inch size (that is, double-postcard size), are arranged.

The controller 21 distributes image data to a printer device in accordance with a print size designated by a user.

Figure 3:
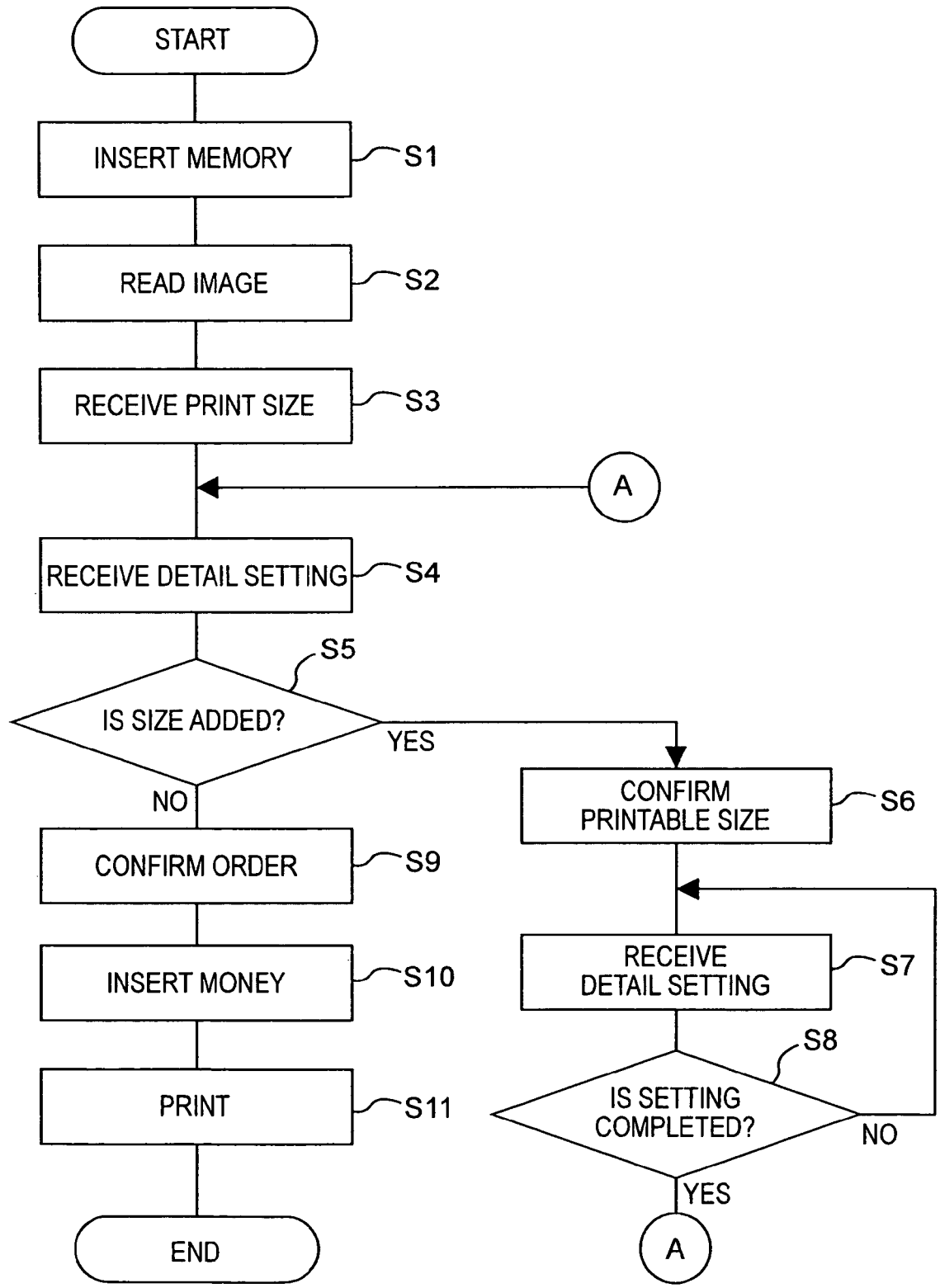
FIG. 3 shows an example of a process for performing printing using the kiosk terminal.

FIG. 3 shows a process performed by the kiosk terminal 1. In other words, a process from insertion of a memory card into the corresponding loading slot 9 to a photograph being output from the photograph ejector 13 is shown.

A user inserts a memory card into the corresponding loading slot 9 (step S1). The data reader 23 reports the insertion of the memory card to the controller 21.

The data reader 23 reads image data stored in the memory card, and transfers the image data to the controller 21 (step S2). The read image data is written into the storage unit 21B.

The controller 21 receives the report of insertion of the memory card, and activates a function to receive a print size by the printing-instruction reception unit 21D (step S3). In the first embodiment, the printing-instruction reception unit 21D displays print sizes that can be selected in accordance with setting information of the printing unit 33.

Here, the selection of the print size is performed for all the images in common. In other words, the print size selected here is an initial size when an order is made. The print size for each image can be changed or added individually, as described below.

The size-information acquisition part 21C1 determines the print sizes displayed as candidates to be selected in accordance with operation information. In other words, only print sizes that can be selected are displayed on a print-size selection screen 41 shown in FIG. 4. The size-information presentation part 21D2 controls the display of the print-size selection screen 41.

Figure 4:
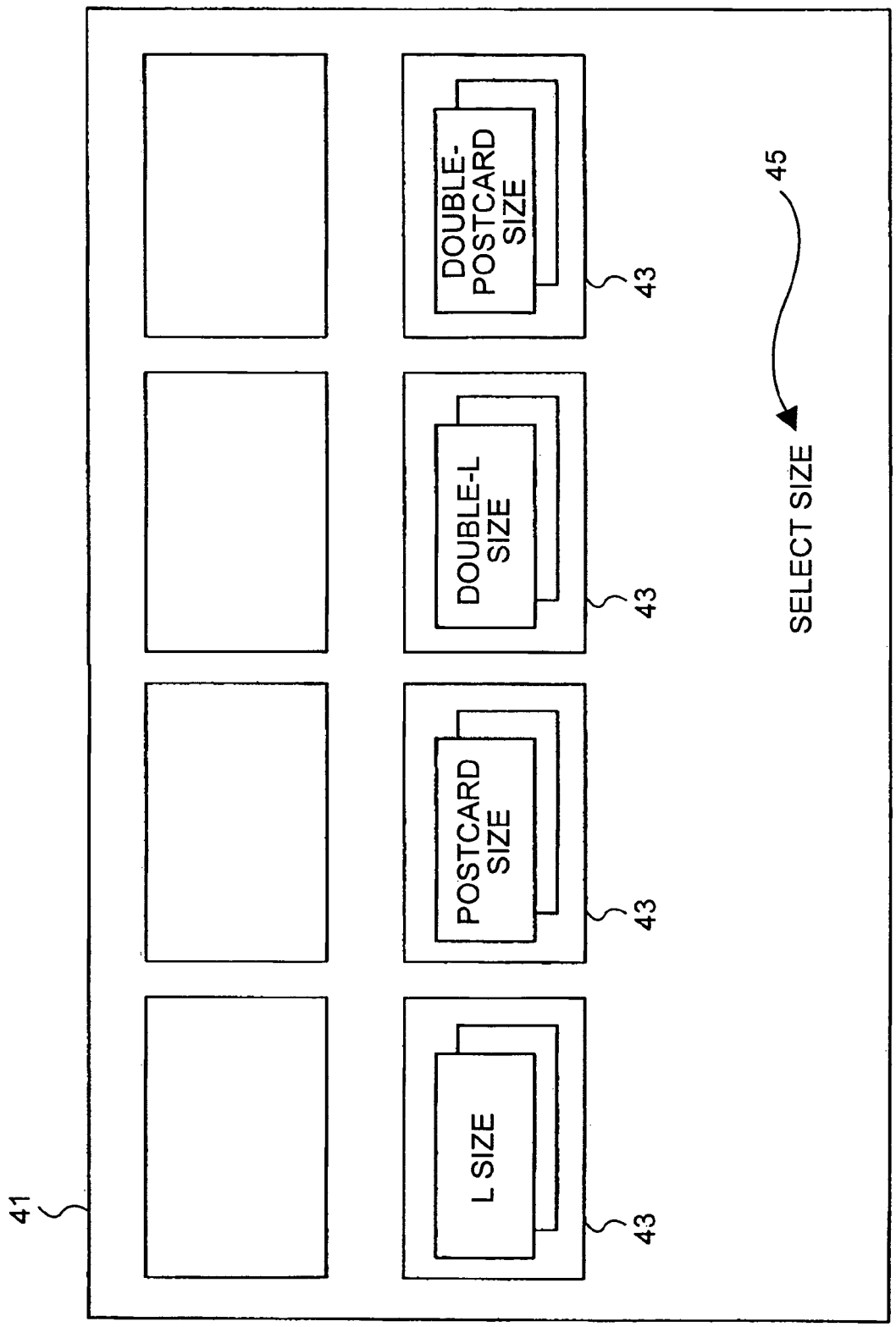
FIG. 4 shows an example of a print-size selection screen.

FIG. 4 shows an example of the print-size selection screen 41. In the example shown in FIG. 4, selection buttons 43 and a comment area 45 are displayed on the print-size selection screen 41. In the example shown in FIG. 4, eight selection buttons can be displayed. However, only the selection buttons 43 corresponding to four print sizes assigned by the printing unit 33 are shown in FIG. 4.

A description for the print-size selection screen 41 is indicated in the comment area 45. In this example, "select size" is indicated as "an operation required for the user".

At this time, the audio unit 29 outputs a voice message, such as "please select a print size".

When the user touches one of the selection buttons 43, the printing-instruction reception unit 21D proceeds to detail-setting processing (step S4). In the first embodiment, "L size" is selected.

Figure 5:
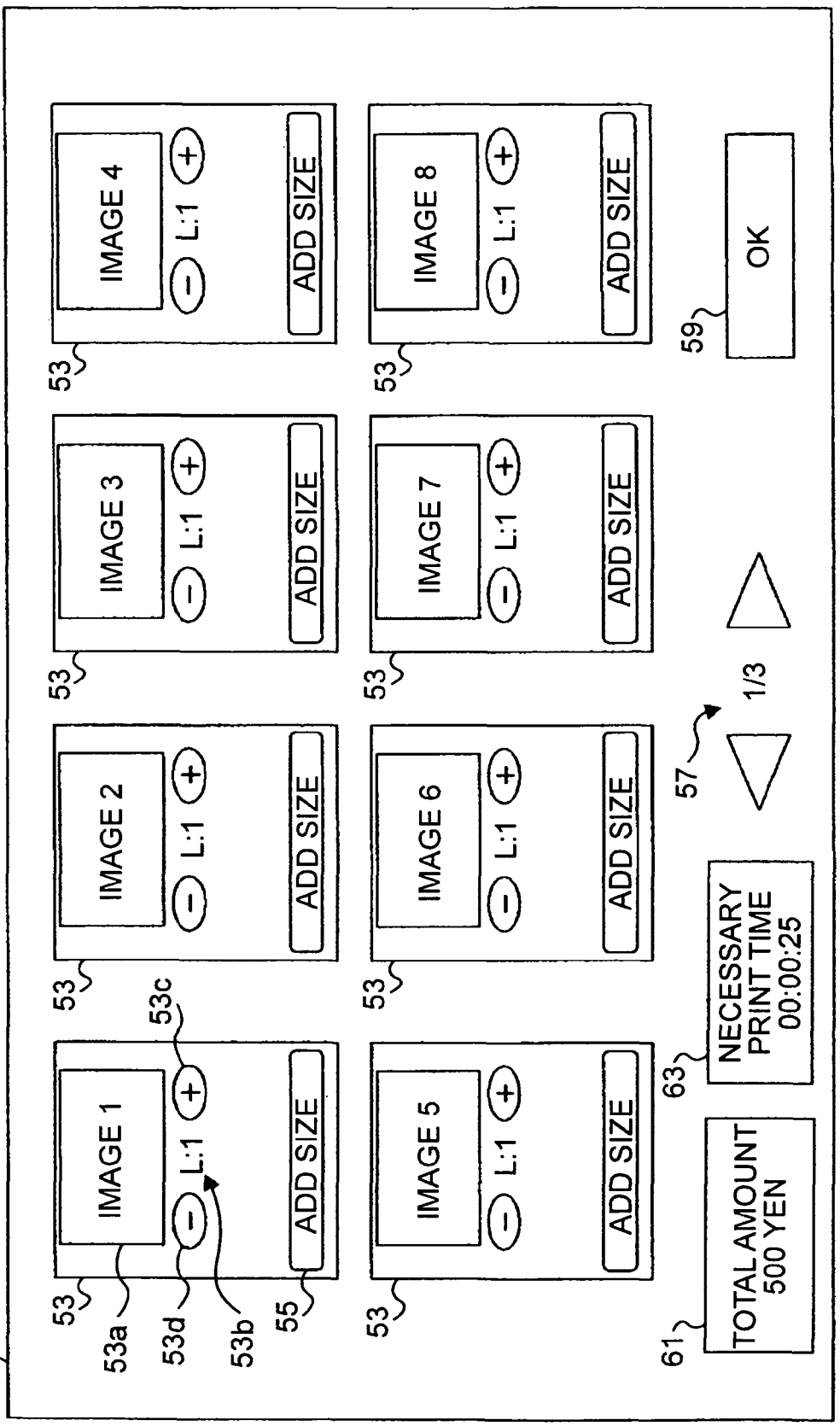
FIG. 5 shows an example of a detail-setting screen.

FIG. 5 shows an example of a detail-setting screen 51. In the example shown in FIG. 5, individual setting areas 53, size-addition buttons 55, a page display area 57, a set button 59, a charge indication area 61, and a print time area 63 are displayed on the detail-setting screen 51.

The individual setting areas 53 are displayed corresponding to images to be printed. In the example shown in FIG. 5, the eight individual setting areas 53 are displayed on the whole screen. A thumbnail image field 53$a$, a size and number of copies field 53$b$, an increment key 53$c$, and a decrement key 53$d$ are displayed in each of the individual setting areas 53.

The thumbnail image field 53$a$ is used for confirming an image. The size and number of copies field 53$b$ is used for confirming the print size and the number of copies to be printed. FIG. 5 shows an initial screen state. In other words, a state in which one copy is printed in an L size is shown. The increment key 53$c$ is used for instructing an increase in the number of copies to be printed. The decrement key 53$d$ is used for instructing a reduction in the number of copies to be printed.

The size-addition buttons 55 are used for adding a print size. The size-addition buttons 55 are used when the user wants to print an image in a plurality of print sizes or the user wants to change the print size. The total number of list display screens, a region indicating the current position, and page skip buttons are displayed in the page display area 57. The set button 59 is used for setting the selected state. When the set button 59 is operated, the print size and the number of copies to be printed for each image are set.

The charge indication area 61 indicates a charge required for the current print conditions (the print size and the number of copies to be printed). In the example shown in FIG. 5, "500 YEN" is indicated. The print time area 63 indicates the time required from the start of printing to outputting of a photograph. In the example shown in FIG. 5, "25 seconds" is indicated.

When the user touches the size-addition buttons 55 on the detail-setting screen 51, the printing-instruction reception unit 21D proceeds to multi-size printing processing (steps S6 to S8).

In contrast, if the user touches the set button 59 on the detail-setting screen 51, the printing-instruction reception unit 21D proceeds to order confirmation processing (step S9). The user operation is detected by the multi-size printing-instruction reception part 21D1.

Figure 6:
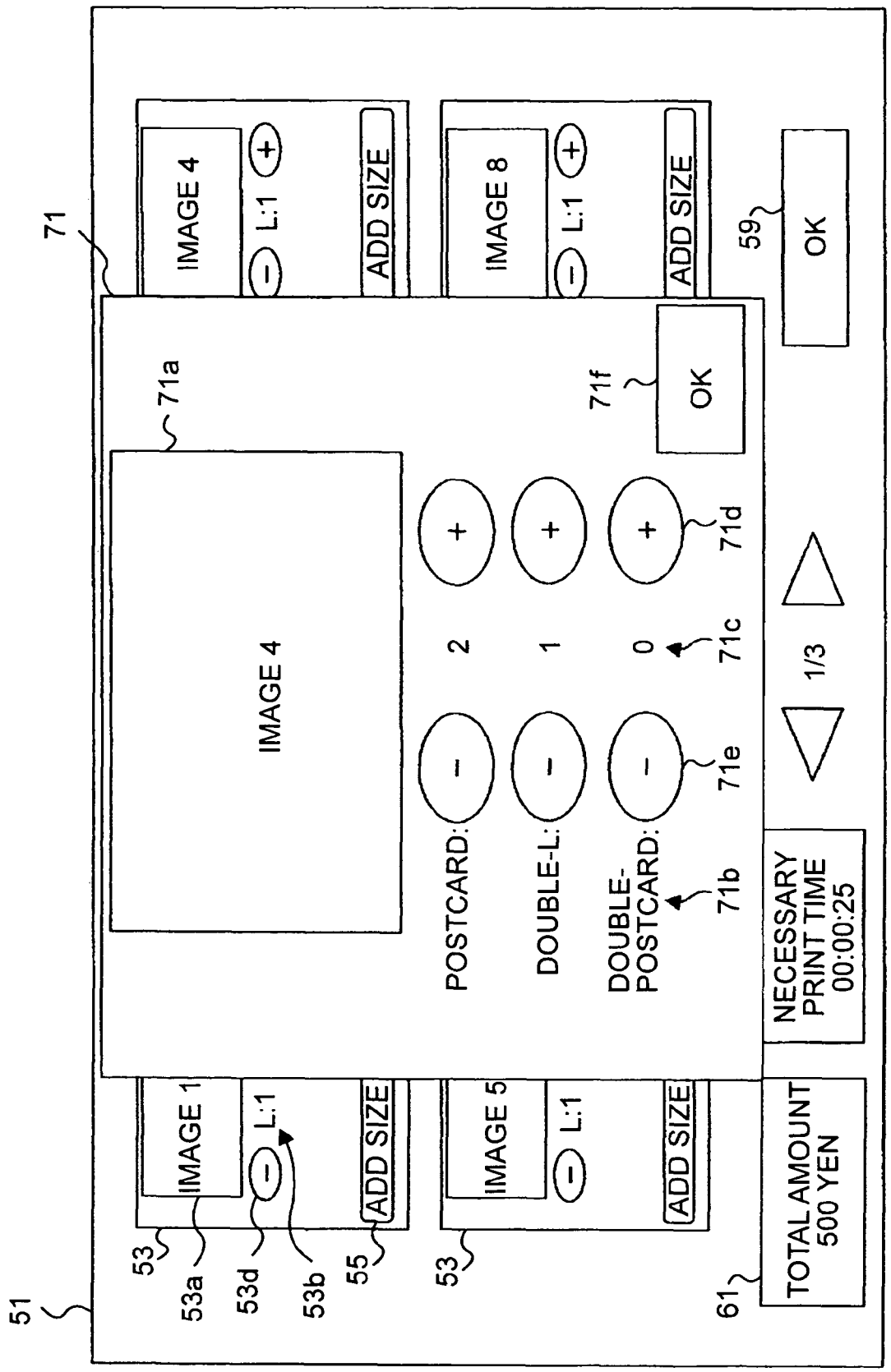
FIG. 6 shows an example of a size-addition screen.

Here, it is assumed that the user operates the size-addition buttons 55. FIG. 6 shows an example of a size-addition screen 71. In the example shown in FIG. 6, the size-addition screen 71 is displayed overlapping approximately the center of the detail-setting screen 51.

In the example shown in FIG. 6, a thumbnail image field 71a, size fields 71b, number of copies indication fields 71c, increment keys 71d, decrement keys 71e, and a set button 71f are displayed on the size-addition screen 71.

The thumbnail image field 71a is used for confirming an image for which a print size is added. In the example shown in FIG. 6, a print size is added for an "image 4".

The size fields 71b indicate sizes that can be added other than the initial size (in this example, "L size"). Print sizes indicated on the screen as candidates to be selected are given by the size-information acquisition part 21C1 (step S6). FIG. 6 shows a case where three print sizes can be added.

Figure 7:
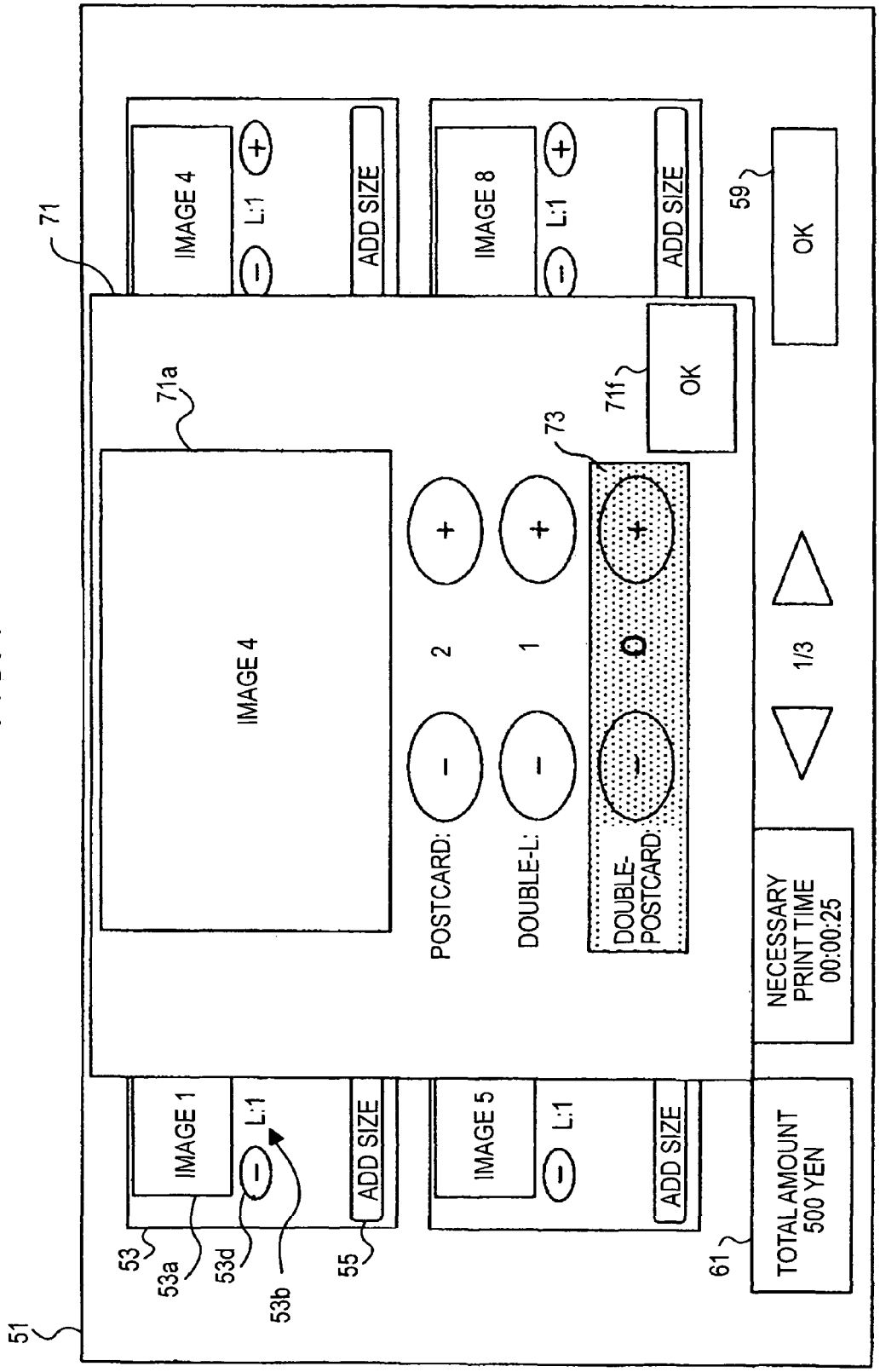
FIG. 7 shows another example of the size-addition screen.

If a print size that cannot be added exists, another size-addition screen, which is different from the screen shown in FIG. 6, is used. For example, an addition screen 71 shown in FIG. 7 is displayed. In FIG. 7, a print size that cannot be designated when a printing instruction is received is displayed in gray. As shown in FIG. 7, a display item 73 corresponding to a "double-postcard size" is displayed in gray.

Each of the number of copies indication fields 71c indicates the number of copies set by the user for each print size. In the example shown in FIG. 6, the number of copies to be printed in the "postcard size" is set to "two" and the number of copies to be printed in the "double-L size" is set to "one" (step S7). In other words, a reservation for printing the "image 4" in three print sizes is made.

The increment keys 71d are used for increasing the number of copies to be printed. The decrement keys 71e are used for reducing the number of copies to be printed. The set button 71f is used for setting the added print size. When the user touches the set button 71f, the size-addition screen 71 is closed (step S8).

The user can set the numbers of copies to be printed for respective print sizes separately by using the size-addition screen 71.

Every time the user sets the number of copies to be printed for each print size, the CPU 21A acquires operation information of a printer device corresponding to the print size, and calculates the time required for completing the printing. The calculation result is indicated in the charge indication area 61 as a necessary print time.

Figure 8:
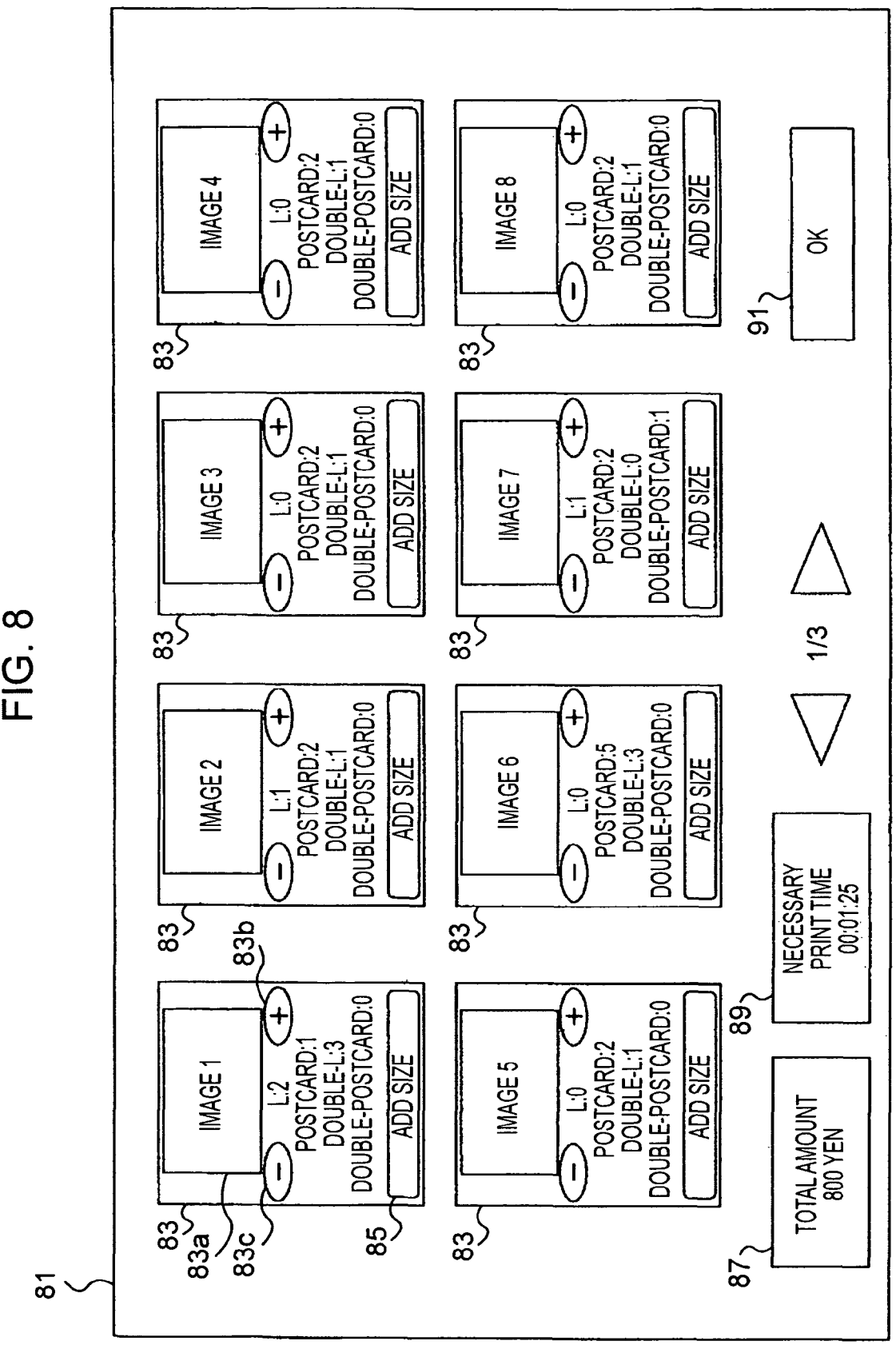
FIG. 8 shows an example of a detail-setting screen after size addition is completed.

FIG. 8 shows an example of a detail-setting screen 81 displayed after addition of the print size using the size-addition screen 71 is completed. Four print sizes and the numbers of copies to be printed in the respective sizes are displayed in each of individual setting areas 83 on the detail-setting screen 81.

On the detail-setting screen 81, the user can confirm the numbers of copies to be printed in the respective print sizes set for each of sample image fields 83a.

If the number of copies to be printed in the "L size" needs to be corrected, the user operates an increment key 83b or a decrement key 83c. In contrast, if the number of copies to be printed in another size needs to be corrected, correction is made on the size-addition screen 71. In this case, the user presses a size-addition button 85 to re-display the size-addition screen 71.

Here, the other display items on the detail-setting screen 81 are equal to those on the detail-setting screen 51 shown in FIG. 5. However, "500 YEN" indicated in the charge indication area 61 in FIG. 5 is changed to "800 YEN" in a charge indication area 87. In addition, "25 seconds" indicated in the print time area 63 in FIG. 5 is changed to "1 minutes and 25 seconds" in a print time area 89. These changes reflect changes in the print size and the number of copies to be printed.

As described above, the user confirms in real time changes in the charge and print time on the same screen on which addition of the print size and the number of copies to be printed are indicated.

Accordingly, when a set button 91 is operated in a state in which the detail-setting screen 81 is displayed, the selected details are set. By detecting this operation, the printing-instruction reception unit 21D proceeds to order confirmation processing (step S9).

Figure 9:
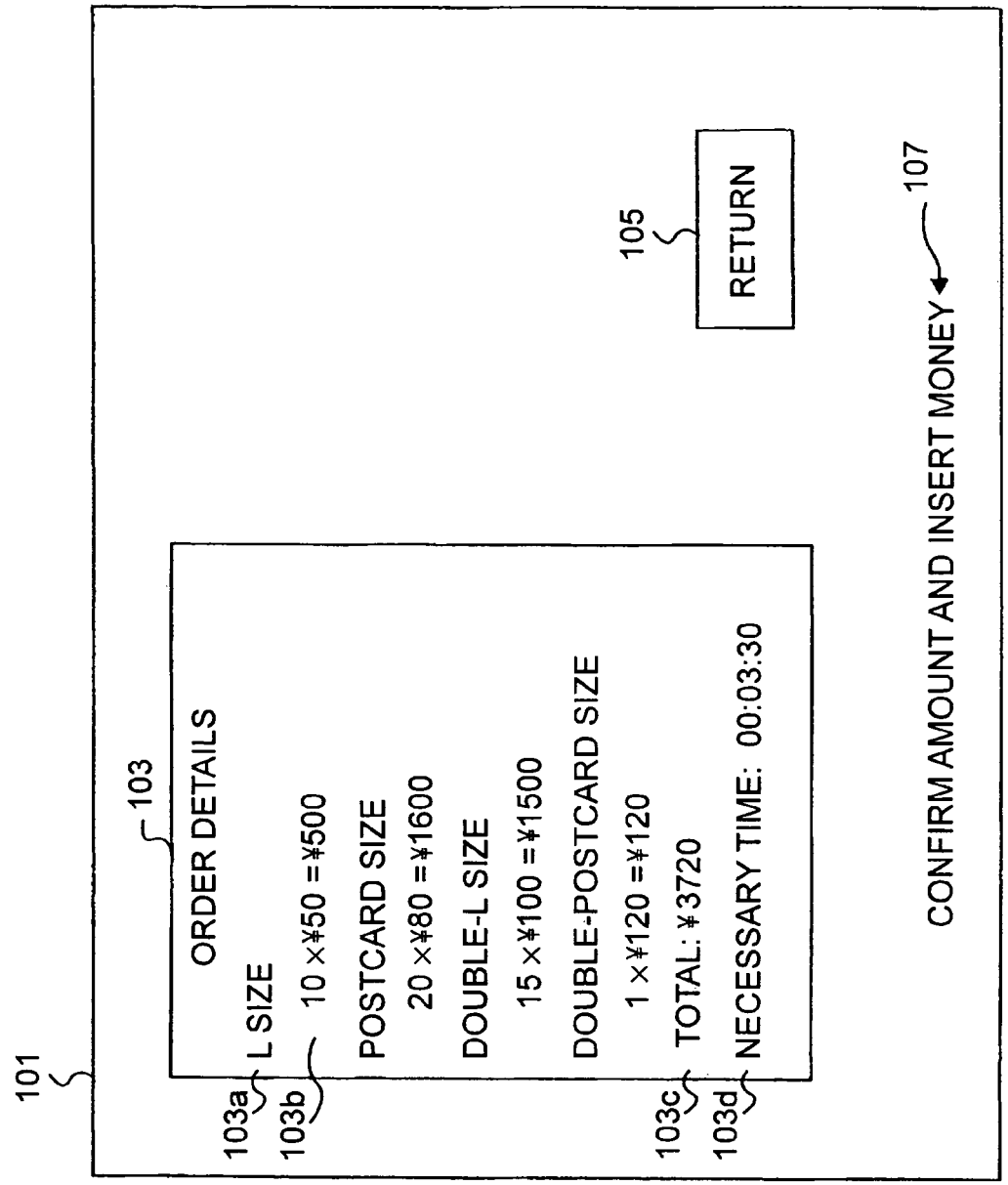
FIG. 9 shows an example of an order confirmation screen.

FIG. 9 shows an example of an order confirmation screen 101. In the example shown in FIG. 9, an order content field 103, a correction button 105, and a comment field 107 are displayed on the order confirmation screen 101.

In the example shown in FIG. 9, ordered print sizes 103a, total numbers 103b of copies to be printed in the respective print sizes, a total amount 103c, and a print time 103d are displayed in the order content field 103.

For example, when ten copies of L-size photographs are ordered and each L-size photograph costs 50 YEN, 500 YEN is indicated as the subtotal. Also, the fact that the total charge for printing processing received as an order is 3,720 YEN and that approximately 3 minutes and 30 seconds are required as the entire print time is indicated.

The correction button 105 is used for changing the order content. When the correction button 105 is operated, the printing-instruction reception unit 21D displays the detail-setting screen 81 again.

A description for the order confirmation screen 101 is displayed in the comment field 107. In this example, "confirm amount" and "insert money" are indicated as "behavior and operation required for the user". Incidentally, the audio unit 29 outputs a voice message, such as "please confirm amount and insert money".

Based on the order confirmation screen 101, when the user inserts the required money into the coin slot 11a, the money reception unit 31 reports to the output control unit 21F the insertion of money (step S10).

After confirming the insertion of money, the output control unit 21F gives a printing instruction to the printing unit 33 (step S11). The output control unit 21F performs the processes shown in FIGS. 10 and 11 for each image to be printed.

The multi-size-printing determination part 21F1 determines whether or not a plurality of print sizes is set for a piece of image data (step S21). In other words, it is determined whether or not multi-size printing is set.

Figure 10:
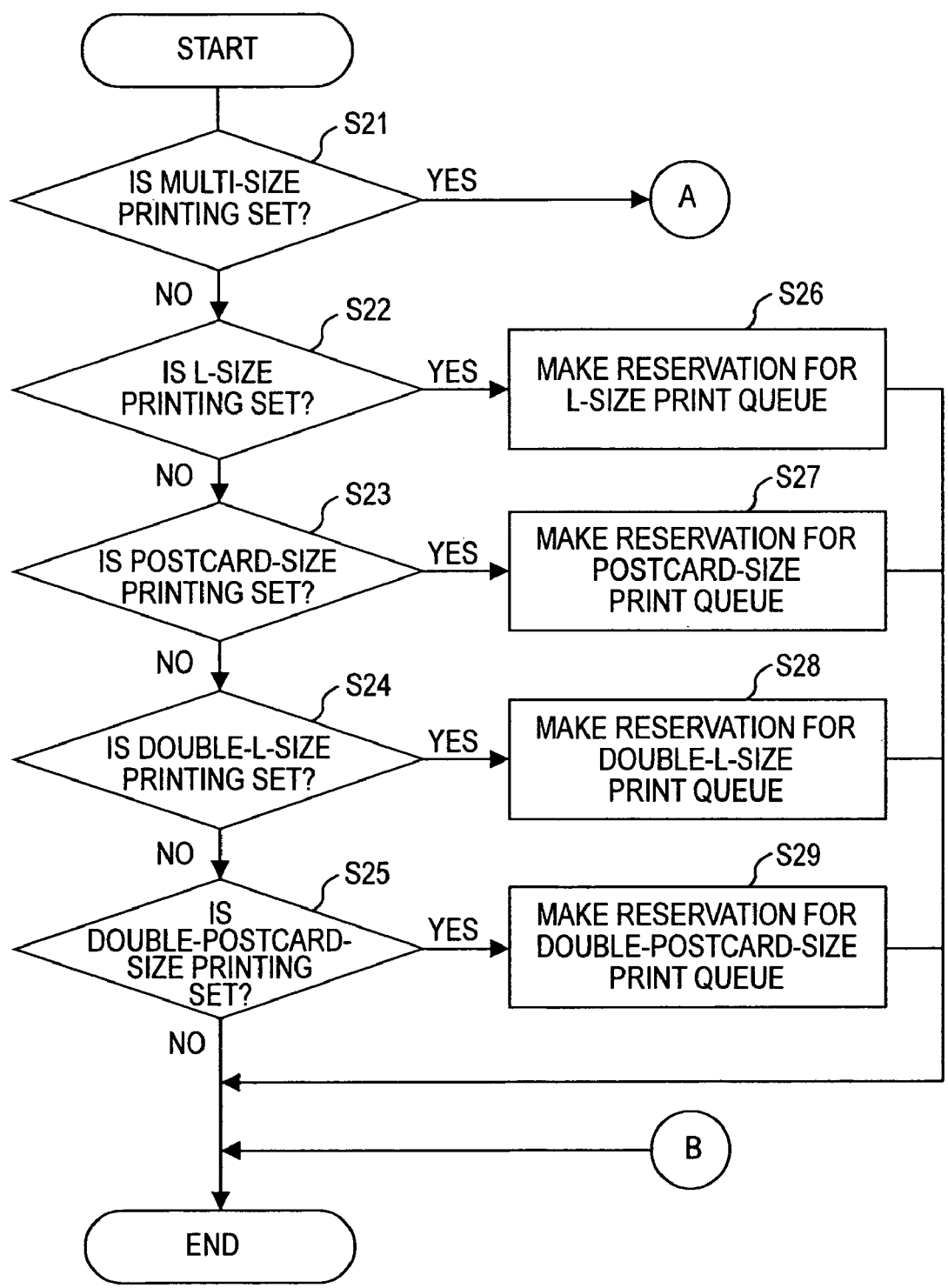
FIG. 10 shows an example of an output control operation.

Here, it is assumed that printing in a single size is designated. In this case, the process shown in FIG. 10 is performed.

The data distributing part 21F2 determines a designated print size (steps S22 to S25). In other words, it is determined whether or not the print size is set to the "L size" in step S22, it is determined whether or not the print size is set to the "postcard size" in step S23, it is determined whether or not the print size is set to the "double-L size" in step S24, and it is determined whether or not the print size is set to the "double-postcard size" in step S25.

When the print size is determined, the data distributing part 21F2 reserves printing for a print queue corresponding to the determined print size. For example, if the print size is set to the "L size", the process proceeds to step S26, and printing is reserved for the corresponding print queue. If the print size is set to another print size, similar processing is performed (steps S27 to S29).

Since printing in a single size is to be performed in this case, after reserving printing for a print queue, the process ends. Then, it is determined whether or not multi-size printing is set for the next image data.

Figure 11:
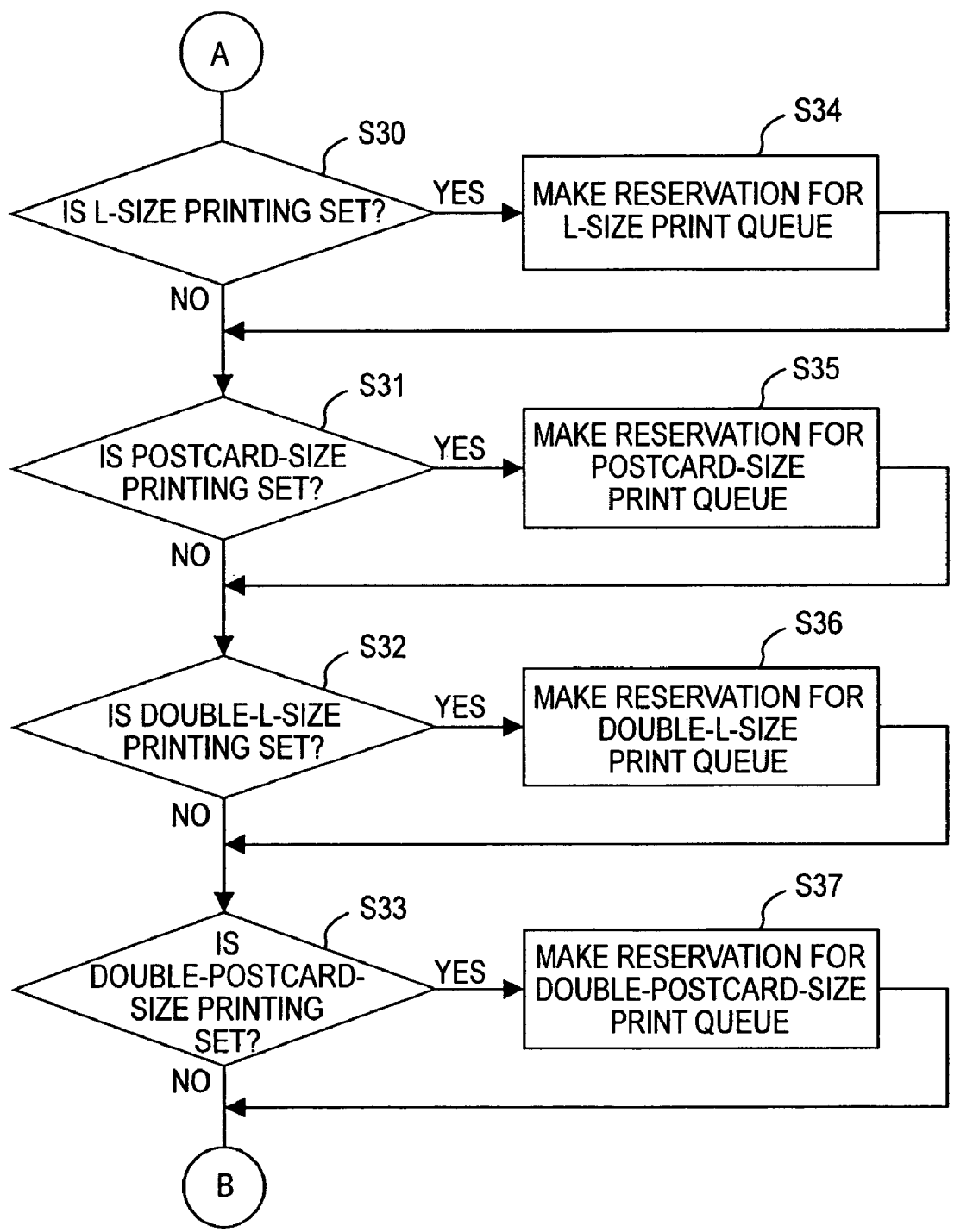
FIG. 11 shows an example of another output control operation.

In contrast, if it is determined that multi-size printing is set in step S21, the process shown in FIG. 11 is performed. The data distributing part 21F2 determines designated print sizes (steps S30 to S33). The processing in steps S30 to S33 is the same as the processing in steps S22 to S25. Also, processing for reserving printing for corresponding print queues (steps S34 to S37) is equal to the processing in steps S26 to S29.

However, in the case of multi-size printing, even after a reservation for a print queue is made, determination of another print size is continued. In other words, determination of whether or not a printing instruction is received is made for all of the print sizes. By this determination processing, a plurality of print reservations can be made for a piece of image data.

For example, for "image 1" shown in FIG. 8, positive determination results are obtained in steps S30, S31, and S32, and printing for the designated number of copies is reserved.

Figure 12A:
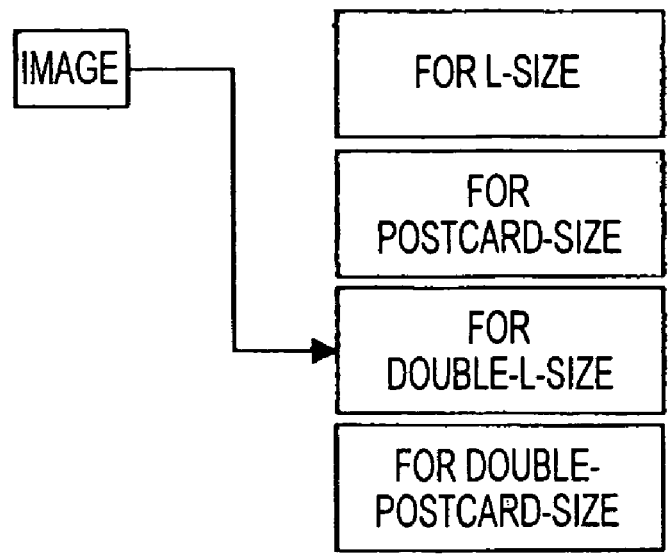
FIGS. 12A and 12B show the conceptual structures of the output control operations.
Figure 12B:
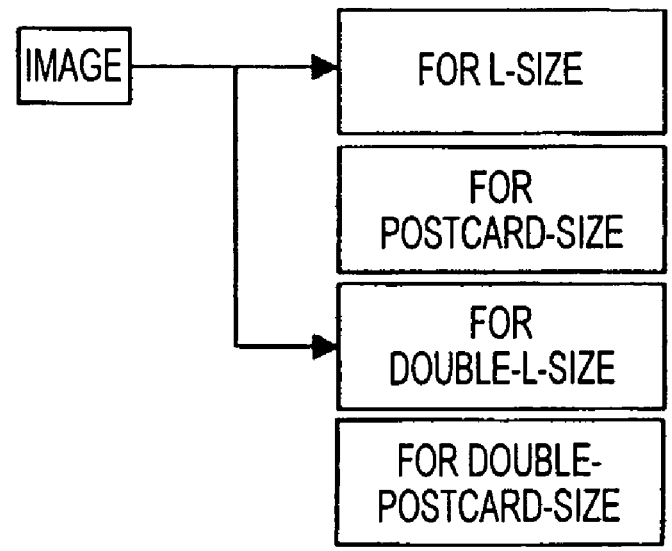

FIGS. 12A and 12B are conceptual diagrams of the output control processing. FIG. 12A is a conceptual diagram of single-size printing. FIG. 12B is a conceptual diagram of multi-size printing. As shown in FIG. 12B, a plurality of print sizes is reserved for an image.

The printing unit 33 prints images in the order reserved for a print queue. The printed images are ejected at the photograph ejector 13. The printing unit 33 performs printing processing via a plurality of printer devices in parallel.

As described above, printing in a plurality of print sizes constituting an order is performed in parallel. Thus, a time required for completing the printing processing is reduced compared with known printing processing. The processes described above are performed for each order operation.

The use of the kiosk terminal 1 realizes multi-size printing of an image by one reception operation. Thus, users will not be annoyed due to repetition of reception operations a plurality of times, unlike known apparatuses. In addition, as a result, redundancy operations are eliminated, and a reception time can be reduced. This is also effective in terms of improving the operating efficiency of the kiosk terminal.

In addition, users can confirm the designated state of multi-size printing for an image on the same screen. Thus, users can easily confirm the designation of each of a plurality of print sizes. Thus, omitted designations of print sizes can be prevented.

In addition, since only a printing-instruction reception operation is needed, users can easily know the total print charge, including multi-size printing for an image. In other words, unlike a case where a plurality of printing-instruction reception operations is needed, users do not need to calculate the total amount by adding print charges for a plurality of printing-instruction reception operations.

In addition, since users can see the total print charge at the reception of printing instructions, users can adjust the number of copies to be printed taking into consideration the total charge prior to execution of printing. Thus, users will not be annoyed due to unnecessary printing or an unexpectedly high cost.

Similarly, since users can confirm the total print time at the reception of printing instructions, users can adjust the number of copies to be printed taking into consideration the total time prior to execution of printing. Thus, users will not be annoyed due to an unexpectedly long print time.

In addition, the use of the kiosk terminal 1 according to the first embodiment presents to users print sizes that can be printed when an order is made. In this example, sizes that are not indicated in gray can be used for printing.

As a result, users can determine, when an order is made, whether to print in a print size that can be used or to cancel the current order.

In addition, since users can know the availability of printing before starting printing processing, an unexpected interruption of the printing processing, output failure, cancellation of printing processing, and the like can be prevented. This enhances user satisfaction.

In addition, since printing only in printable sizes is reserved, the operating efficiency of the kiosk terminal 1 is improved.

In addition, the kiosk terminal 1 according to the first embodiment performs printing processing via a plurality of printer devices at the same time in parallel. Thus, the print time for multi-size printing can be reduced.

In addition, for multi-size printing of an image, the kiosk terminal 1 makes print reservations for a plurality of printer devices at the same time. Thus, the time required before the start of printing can be reduced.

In addition, in the first embodiment, print reservations are made for print queues prepared for respective sizes, and printer devices corresponding to the respective sizes perform printing processing in parallel.

Thus, if different print sizes are designated between a plurality of consecutive orders, printing processing for one order and printing processing for the next order are started in parallel. As a result, the waiting time from placing an order to outputting a photograph can be reduced.

In addition, this is effective in improving the operating efficiency of the entire kiosk terminal 1.

Modifications of First Embodiment (a) Although paper sizes other than a paper size that has already been designated are displayed on a screen as paper sizes that can be added in the foregoing embodiment (see FIG. 6), addition of a print size and correction of the number of copies to be printed, including the paper size that has already been designated, may be performed at the same time.

With this display procedure, correction of the number of copies to be printed in the print size that has already been designated can also be performed at the same time.

Figure 13:
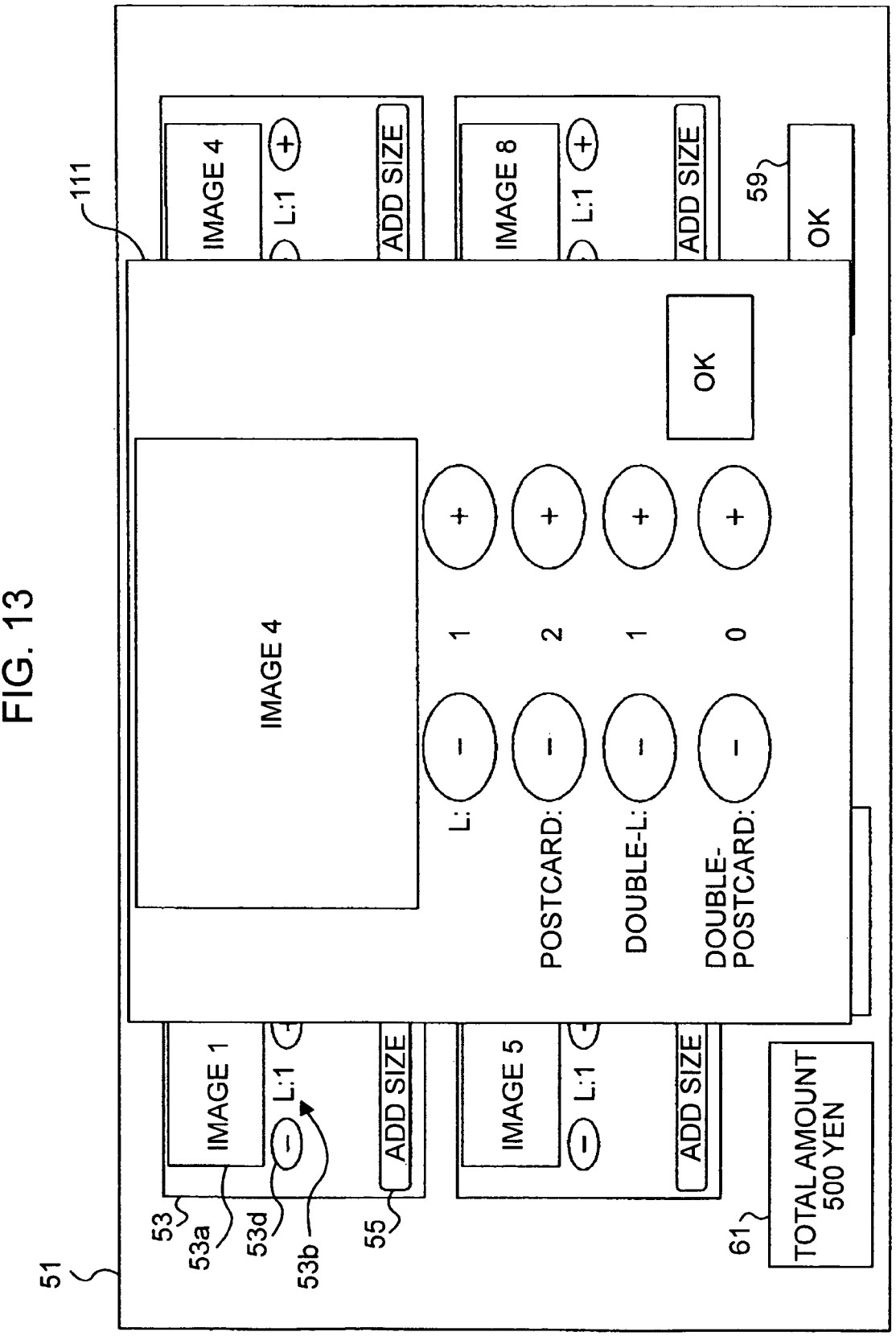
FIG. 13 shows another example of the size-addition screen.

FIG. 13 shows an example of a size-addition screen 111. In the example shown in FIG. 13, the "L size", which has already been set as a print size, is also displayed on the size-addition screen 111.

Figure 14:
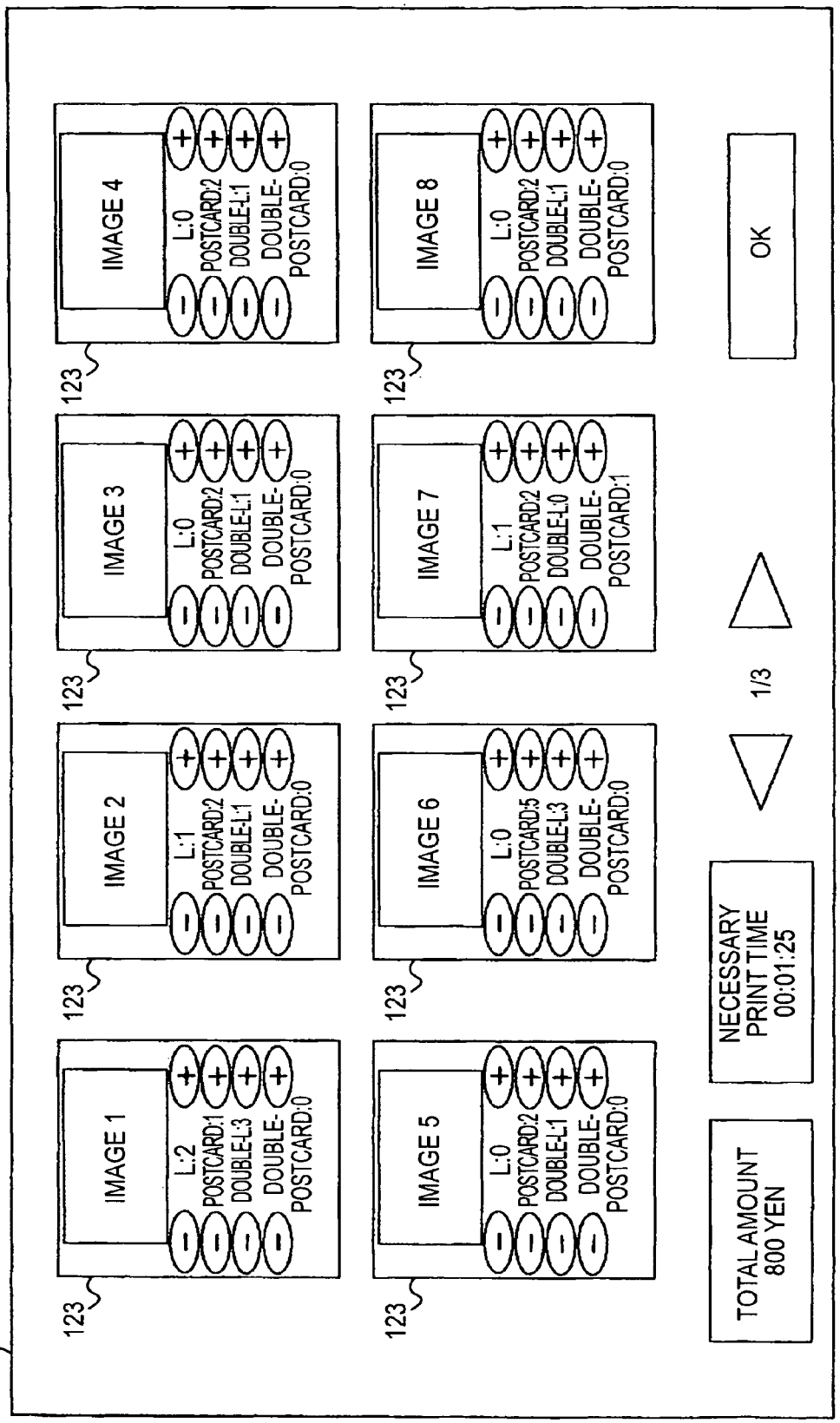
FIG. 14 shows another example of the detail-setting screen.

(b) Although setting of the number of copies to be printed for multi-size printing is performed using the size-addition screen 71 individually prepared for each piece of image data, as shown in FIG. 6, in the foregoing embodiments, multi-size printing of each image may be set directly on a detail-setting screen 121 on which a plurality of images is displayed as a list, as shown in FIG. 14. In the example shown in FIG. 14, all the print sizes handled by the printing unit 33 are displayed in advance in individual setting fields 123 for the respective images. In addition, buttons for increasing and decreasing the number of copies to be printed are displayed so as to correspond to the respective print sizes. In the example shown in FIG. 14, the size-addition buttons 55 shown in FIG. 6 are unnecessary.

With this display procedure, users can confirm at a glance how many print sizes can be used for ordering printing of each image. In addition, users can designate a print size while checking the designated state of other images. Thus, a printing-instruction reception screen convenient for users can be provided.

Figure 15:
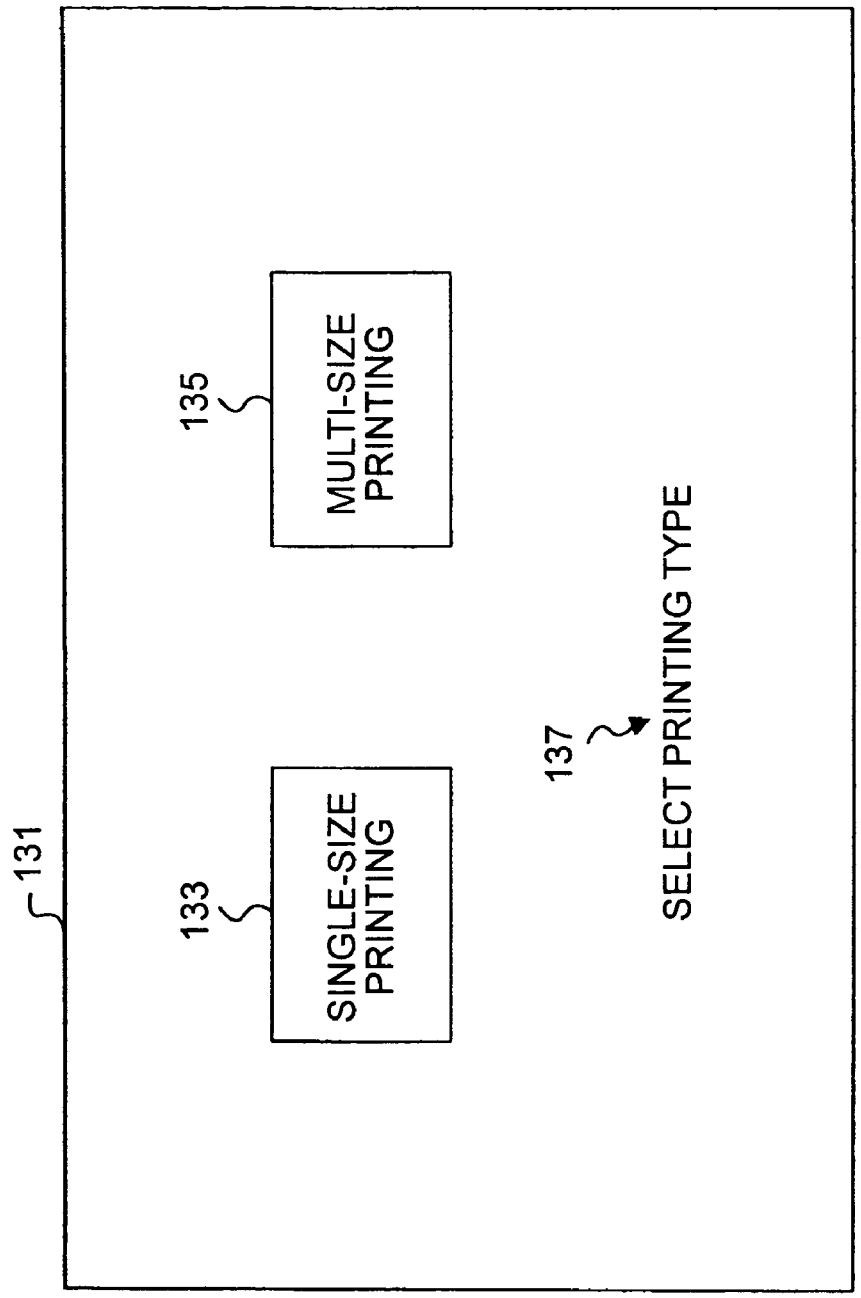
FIG. 15 shows an example of a printing-type selection screen.

(c) Although an initial print size for all the images is selected prior to individually setting the print size and the number of copies for each image, in other words, a print size is selected using the printing-instruction reception screen shown in FIG. 4, in the foregoing embodiments, a printing type-selection screen 131 shown in FIG. 15 may be displayed from the beginning.

In addition, users may desire that a small number of items be displayed when making the printing instruction.

In this case, as shown in FIG. 15, it is preferable that users select in advance a printing-instruction reception screen corresponding to single-size printing or a printing-instruction reception screen corresponding to multi-size printing.

In the example shown in FIG. 15, buttons 133 and 135 corresponding to respective printing types and a comment field 137 are displayed on the printing-type selection screen 131. When a user selects the button 133 for single-size printing, for example, the print-size selection screen shown in FIG. 4 is displayed. When a user selects the button 135 for multi-size printing, for example, the detail-setting screen 121 shown in FIG. 14 is displayed.

With this selection procedure, a simple order screen can be provided to users who desire only single-size printing.

Figure 16:
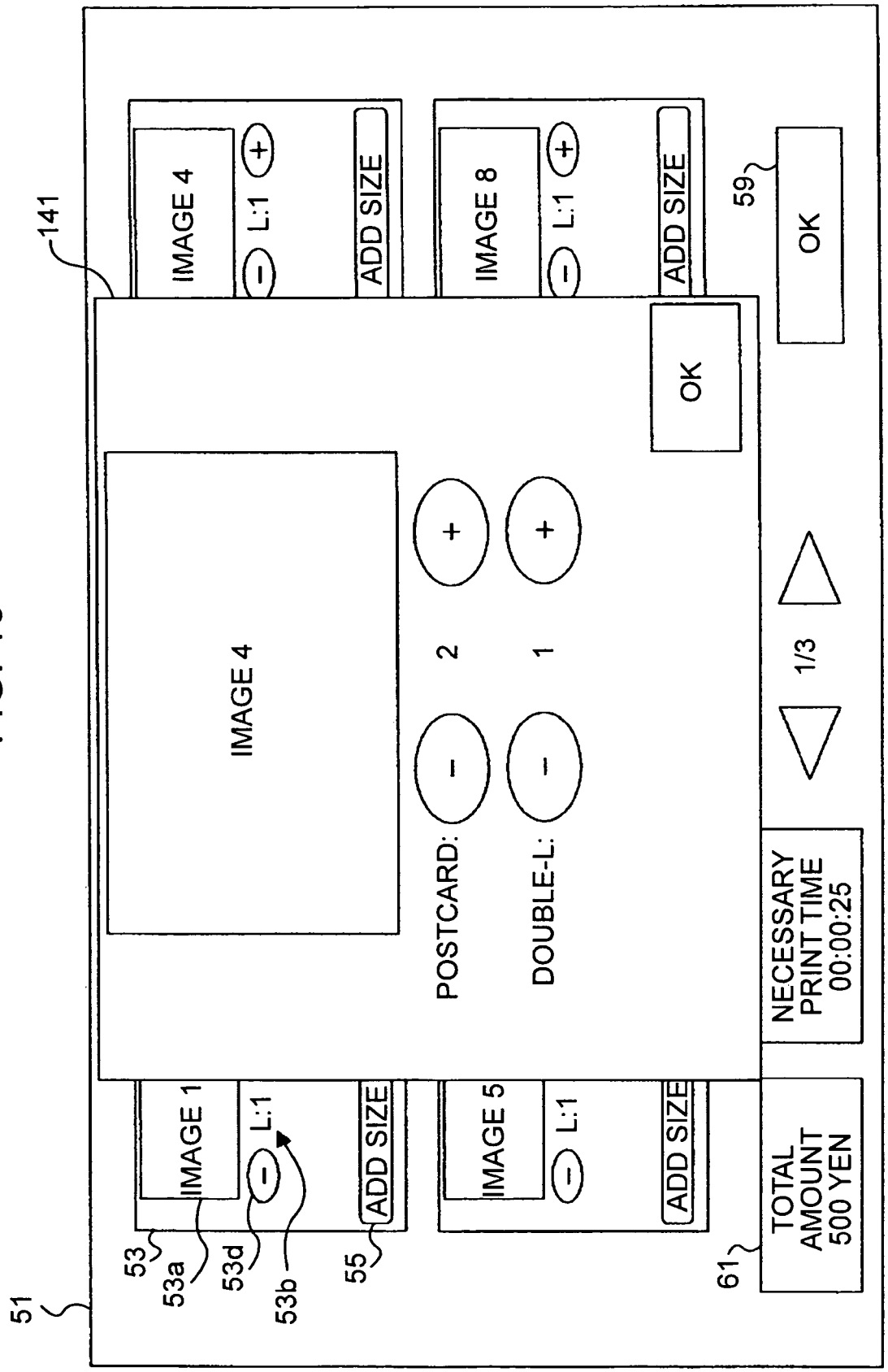
FIG. 16 shows another example of the size-addition screen.

(d) Although a print size that is not selectable when a printing instruction for multi-size printing is received is displayed in gray in the foregoing embodiments, only selectable print sizes may be displayed on a size-addition screen 141, as shown in FIG. 16. FIG. 16 shows a case where the "postcard size" and the "double-L size" can be added.

Figure 17:
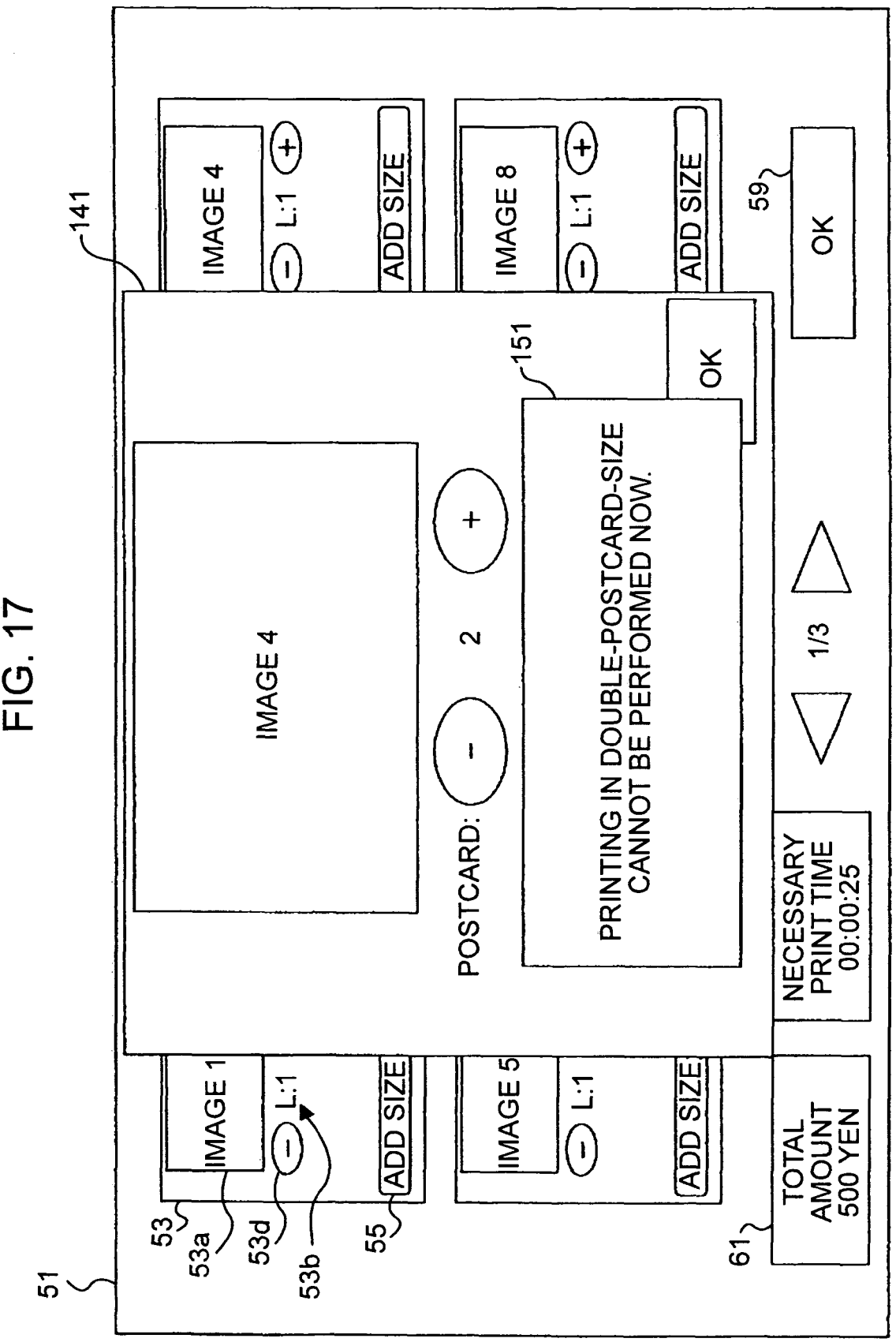
FIG. 17 shows another example of the size-addition screen.

(e) Although a print size that is not selectable when a printing instruction for multi-size printing is received is reported to users by displaying the print size in gray or eliminating the print size from candidates to be selected in the foregoing embodiments, a message indicating that the print size is not selectable may be displayed on a screen when the print size is designated. FIG. 17 shows an example of a message 151. The message 151 is displayed when the "double-postcard size" is designated.

(f) Although a print size that is not selectable when a printing instruction for multi-size printing is received is reported to users by displaying the print size in gray or by displaying a message in the foregoing embodiments, the print size that is not selectable may be reported by rejecting designation of the size.

(g) Although a printing-instruction reception function is provided in the casing of a printer in the foregoing embodiments, the printing-instruction reception function may be provided in an information processing apparatus functioning as a sender or a generator of print data.

Figure 18:
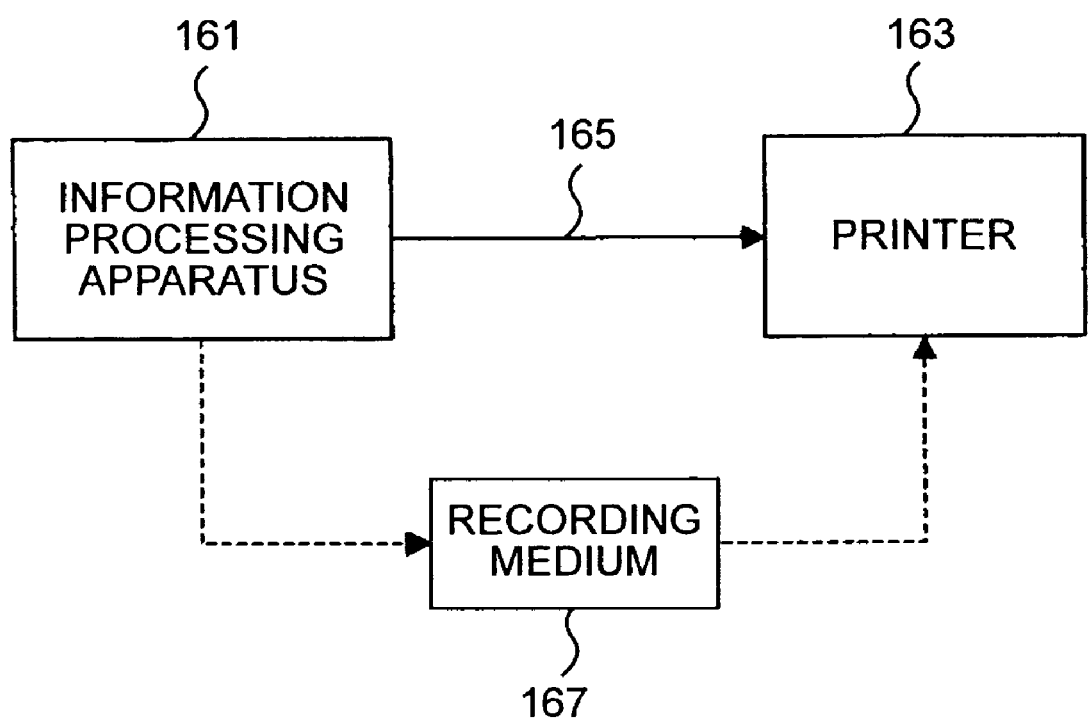
FIG. 18 shows another example of the system structure.

FIG. 18 is a conceptual diagram. FIG. 18 shows a case where an information processing apparatus 161 and a printer 163 are connected to each other via a communication path 165 or a recording medium 167.

The communication path 165 may be wired or wireless. The recording medium 167 is not necessarily a semiconductor memory. The recording medium 167 may be a magnetic recording medium or an optical recording medium (a recording medium that uses light at least for data reading).

In this case, the information processing apparatus 161 is, for example, a computer, a video camera, a digital camera, a game apparatus, a scanner, a mobile information terminal (a mobile computer, a cellular phone, a portable game device, an electronic dictionary, or the like), a clock, an image playback apparatus (for example, an optical disk device or a home server), a display apparatus, or a processing board or card having a function in the foregoing embodiments.

The information processing apparatus 161 includes a casing, a signal processing unit (a print data reading function and a multi-size printing function), and an external interface, and is formed by combining peripheral devices corresponding to the configuration of the information processing apparatus 161.

For example, if the information processing apparatus 161 is an electronic apparatus having a communication function, such as a cellular phone, the information processing apparatus 161 includes sending and receiving circuits and an antenna, in addition to the components described above.

For example, if the information processing apparatus 161 is an image pickup apparatus, such as a video camera or a digital camera, the information processing apparatus 161 includes a camera unit and a writing circuit for storing photographed picture data in the recording medium, in addition to the components described above.

Figure 19:
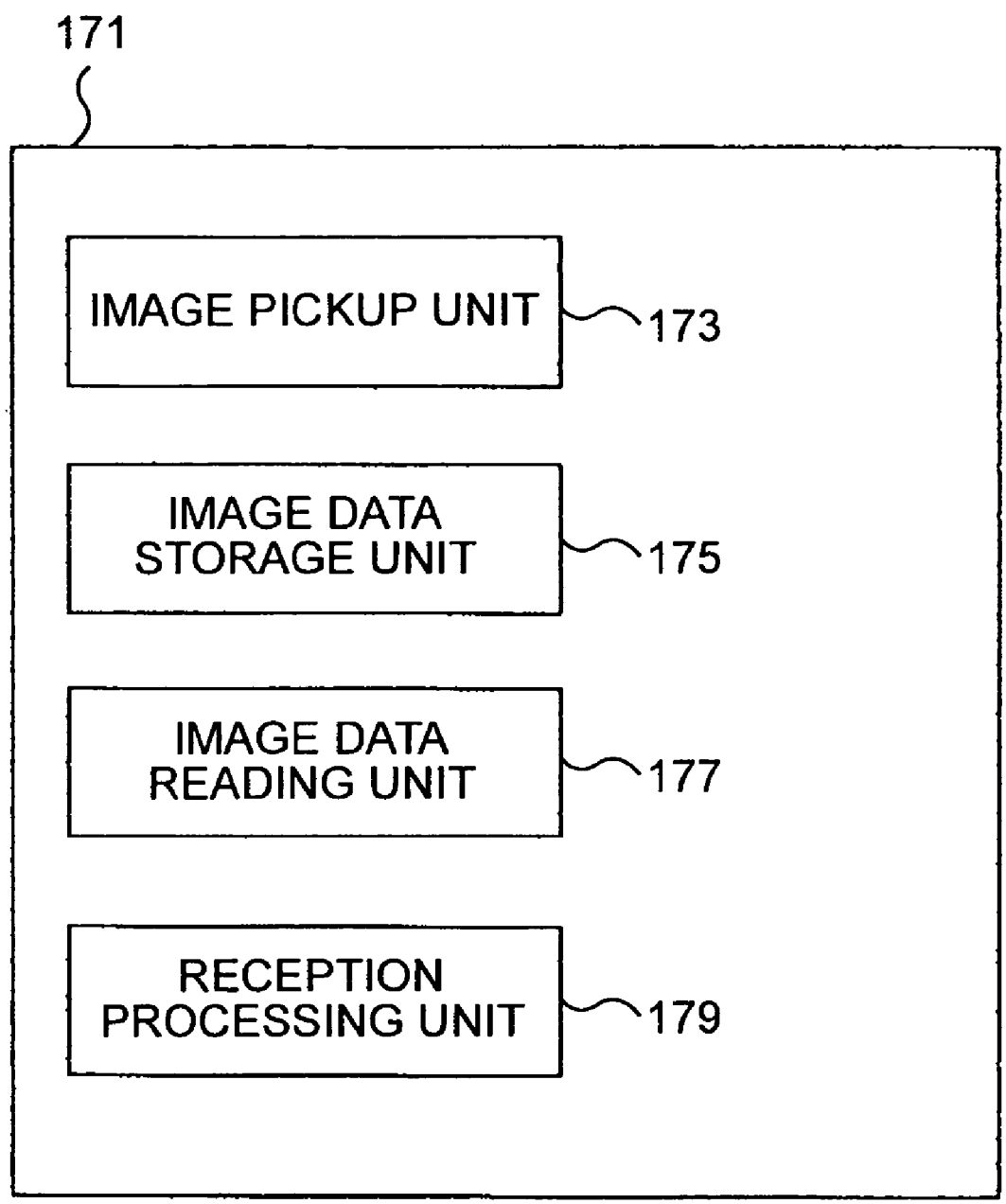
FIG. 19 shows an example of the structure of an image pickup apparatus having a printing-instruction reception function.

FIG. 19 shows an example of the structure of an image pickup apparatus 171. The image pickup apparatus 171 includes an image pickup unit 173, an image data storage unit 175 storing image data of a photographed object in the recording medium, an image data reading unit 177, and a reception processing unit 179.

With this printing-instruction reception function in the foregoing embodiments, multi-size printing of an image can be instructed directly from the image pickup apparatus 171.

The image pickup apparatus 171 is not necessarily an apparatus specialized for image pickup. The image pickup apparatus 171 may be any type of image processing apparatus as long as it has an image pickup function.

(h) Although a printing-instruction reception function is provided in the casing of a printer in the foregoing embodiments, the printing-instruction reception function may be provided in an information processing apparatus (including a server) or a printer that are connected to each other via a network.

Figure 20:
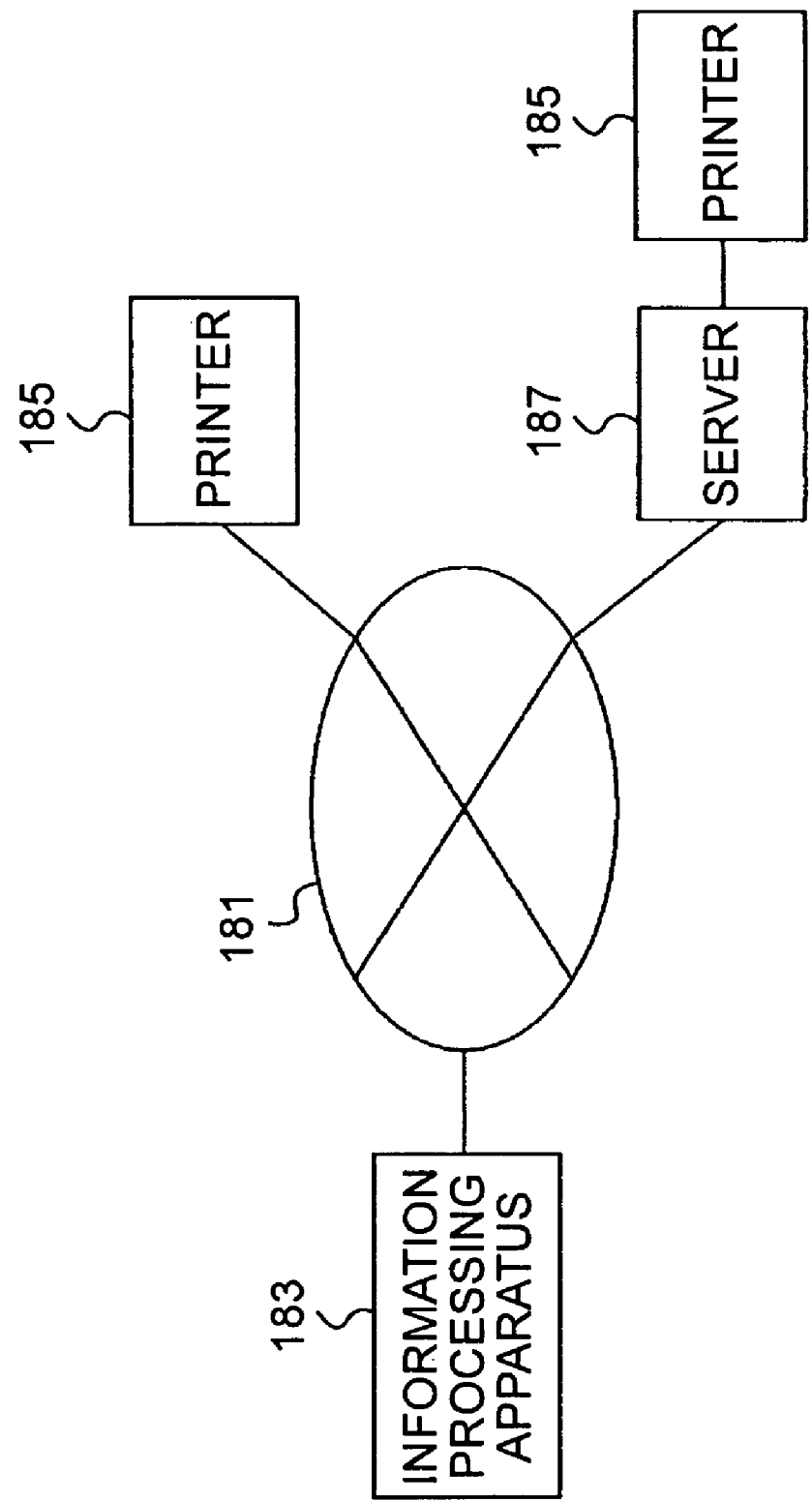
FIG. 20 shows an example of a network system.

FIG. 20 shows an example of a system. This system includes a network 181, an information processing apparatus 183, printers 185, and a server 187.

FIG. 20 shows a case where print data output from the information processing apparatus 183 is output to the printer 185 via the network 181 and a case where print data output from the information processing apparatus 183 is output to the printer 185 via the server 187 connected to the network 181.

In this case, the printing-instruction reception function is provided in the information processing apparatus 183, the printers 185, or the server 187.

For example, the configuration in which the printing-instruction reception function is provided in the server 187 is preferable for a photograph printing system for receiving instructions for photograph printing via the Internet.

The network 181 may be wired or wireless.

Second Embodiment

A second embodiment of the present invention will be described.

The kiosk terminal according to the foregoing embodiments has a function to present to users availability of printing in a print size when a printing instruction is received.

In order to realize parallel printing by a plurality of printer devices and to reduce a print time or a print waiting time, a kiosk terminal according to the second embodiment also has a function to present to users a printer device whose print queue is empty when a printing instruction is received. In other words, the kiosk terminal according to the second embodiment has a function to report to users a printer device or a print size by which printing can be immediately started.

Figure 21:
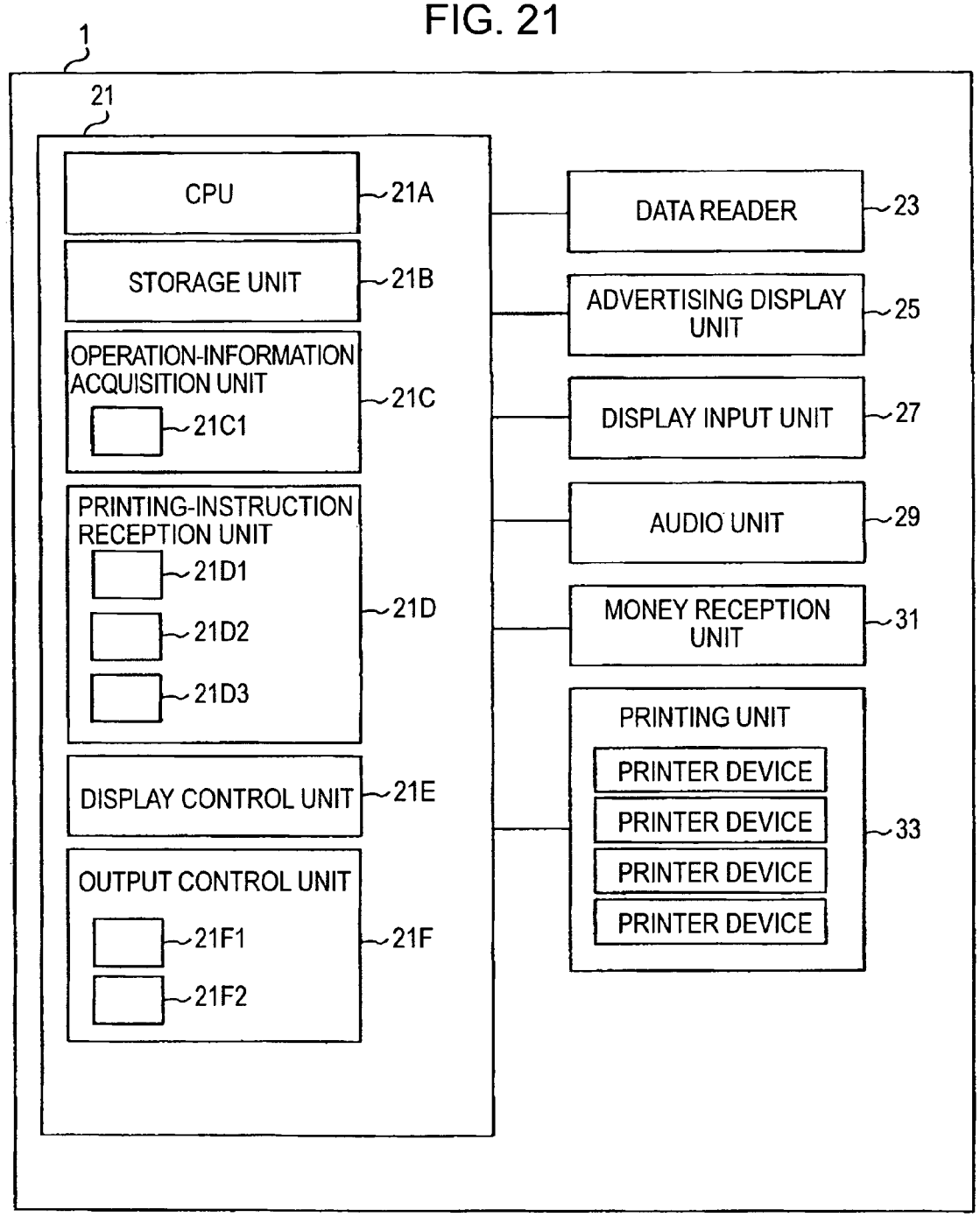
FIG. 21 shows another example of the internal structure of the kiosk terminal.

FIG. 21 shows an example of the structure of the kiosk terminal 1 further including an empty device presentation part 21D3. The kiosk terminal 1 shown in FIG. 21 has the same structure as the kiosk terminal 1 shown in FIG. 2 with the exception of the empty device presentation part 21D3.

The empty device presentation part 21D3 explicitly presents to users information on a printer device that is not operating when a printing instruction is received. Operation information of each printer device is acquired via the operation-information acquisition unit 21C.

In the second embodiment, a printer device and a paper size correspond to each other in a 1:1 relationship.

Thus, with the function of the size-information acquisition part 21C1, the existence or absence of a print queue for each print size can be reported.

This function is effective for receiving another printing instruction when a printer device is operating.

Figure 22:
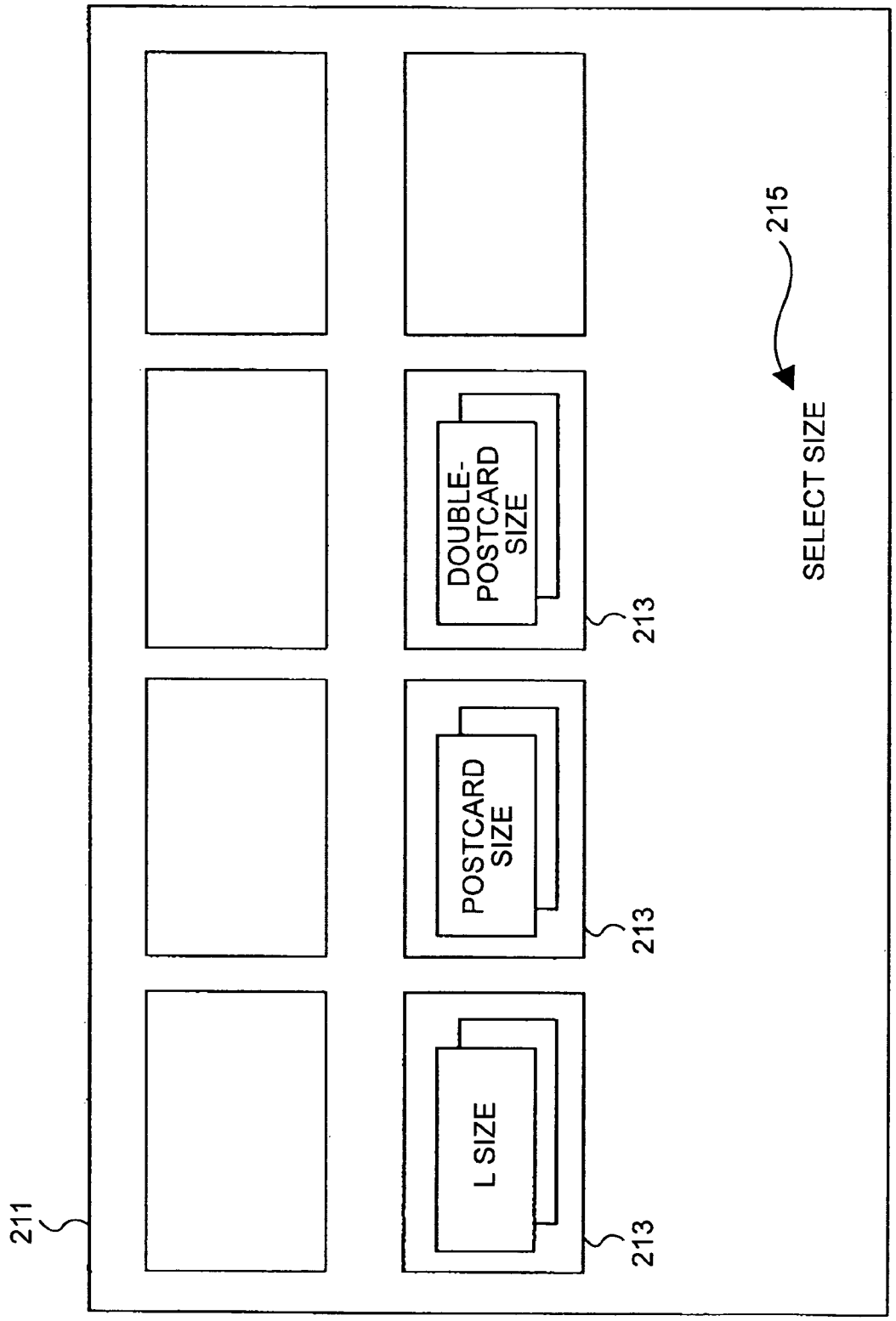
FIG. 22 shows another example of the print-size selection screen.

FIG. 22 shows an example of a print-size selection screen 211. Selection buttons 213 corresponding to respective paper sizes and a comment field 215 are displayed on the print-size selection screen 211. However, only the selection buttons 213 that correspond to paper sizes for which printing can be immediately started are displayed on the print-size selection screen 211.

In other words, only three paper sizes, which are other than the "double-L size" for which printing is being performed or printing is reserved, are displayed. In the second embodiment, a procedure for designating a print size and a procedure for adding a print size are the same as in the foregoing embodiments.

The use of the empty device presentation part 21D3 in the second embodiment enables printing processing using a plurality of printer devices to be performed at the same time in parallel without requiring a print waiting time.

Thus, a print waiting time for users can be reduced as much as possible. This enhances user satisfaction. In addition, the operating efficiency of the kiosk terminal 1 is improved.

Modification of Second Embodiment (a) Although only paper sizes other than a paper size for which printing is being performed or printing is reserved are displayed as candidates to be selected on a screen when a print size is designated in the second embodiment (see FIG. 22), users may desire printing in the paper size for which printing is being performed or printing has already been reserved.

Figure 23:
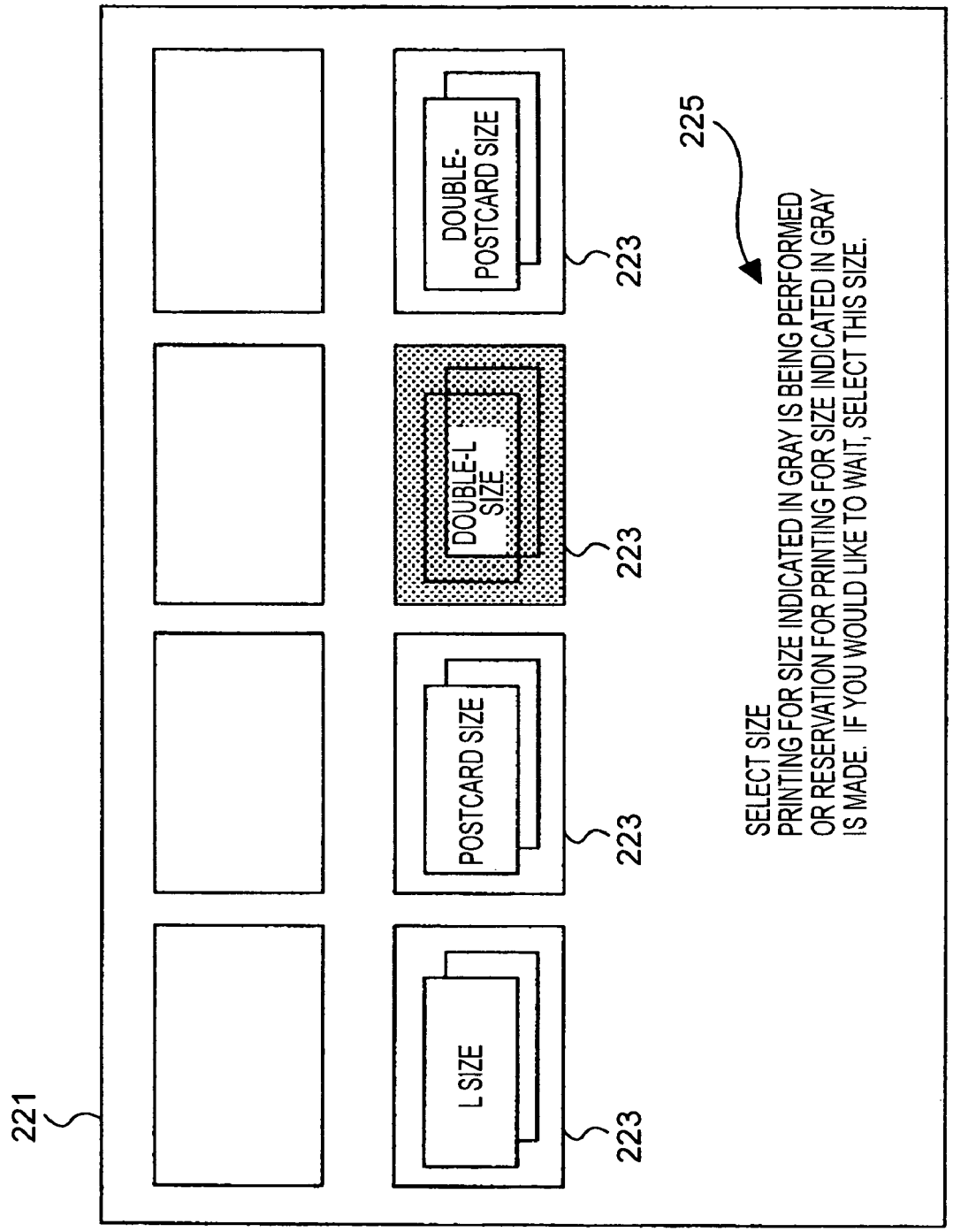
FIG. 23 shows another example of the print-size selection screen.

FIG. 23 shows an example of a print-size selection screen 221. In the example shown in FIG. 23, a selection button 223 corresponding to a paper size for which printing is being performed or printing is reserved is displayed in gray. In FIG. 23, the selection button 223 corresponding to the "double-L size" is displayed in gray. Thus, printing in the "double-L size" can also be performed.

However, as shown in a comment field 225, since printing is being performed or printing is reserved for the "double-L size", a waiting time is required before an image is printed and output. Users know in advance the waiting time required before printing is started. Thus, this enhances user satisfaction.

Obviously, since the kiosk terminal 1 is capable of performing printing in a plurality of print sizes in parallel, the operating efficiency can be improved.

Figure 24:
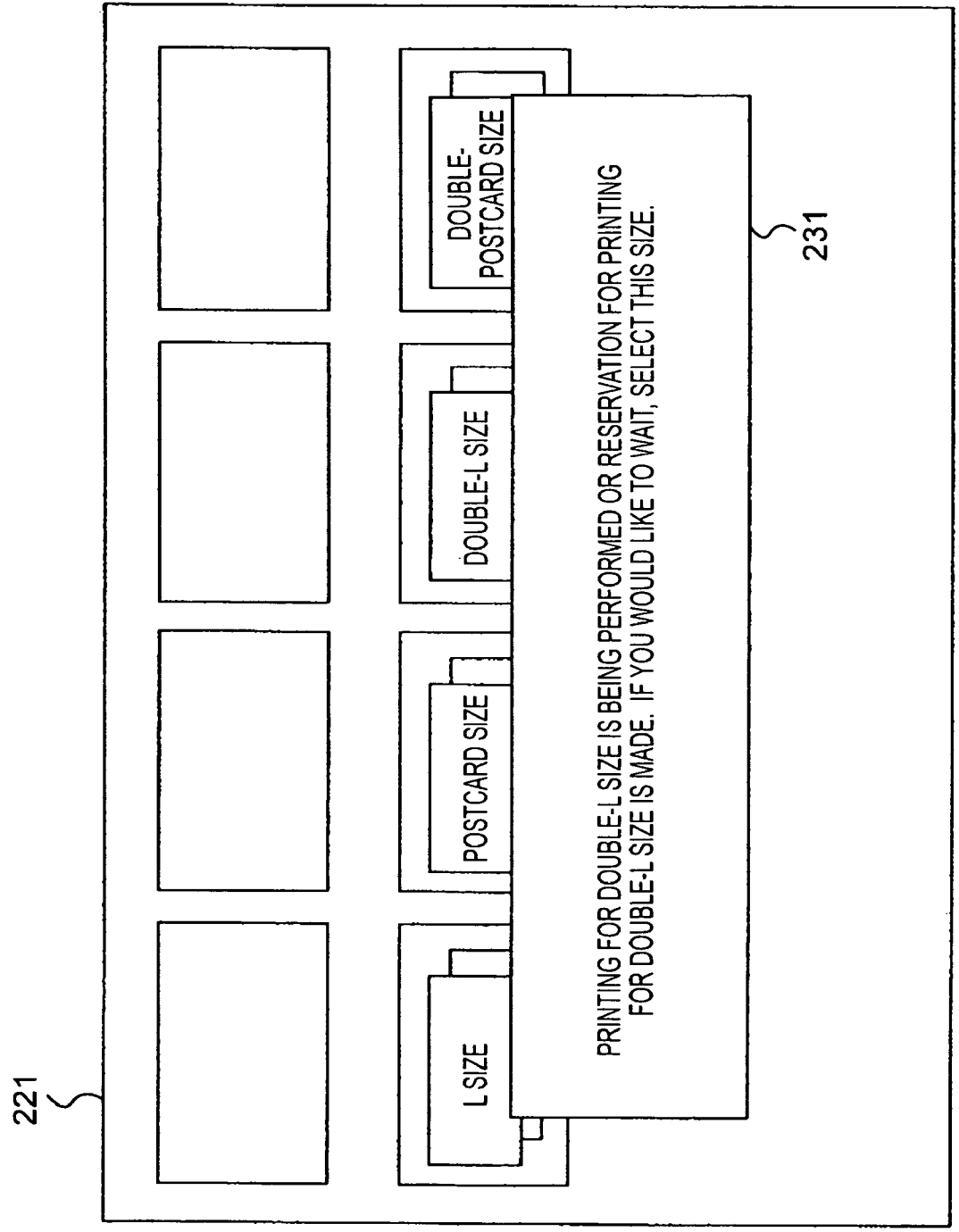
FIG. 24 shows another example of the print-size selection screen.

(b) Although a print size for which a waiting time before the start of printing is required is reported to users by displaying the print size in gray or eliminating the print size from candidates to be selected in the foregoing embodiments, a message indicating that the print size requires a waiting time may be displayed when the print size is designated. FIG. 24 shows an example of a message 231. The message 231 is an example displayed when the "double-L size" is designated.

(c) Although a printing-instruction reception function and an output control function are provided in the casing of a printer in the foregoing embodiments, the printing-instruction reception function and the output control function may be provided in an information processing apparatus functioning as a sender or a generator of print data.

Figure 25:
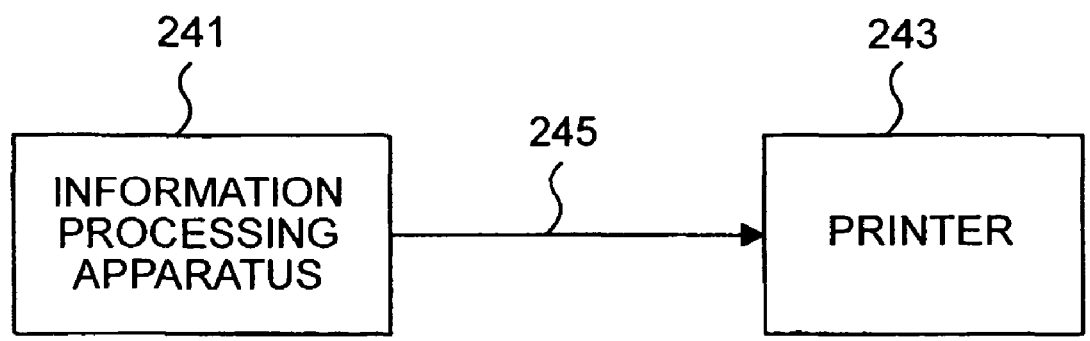
FIG. 25 shows another example of the system structure.

FIG. 25 is a conceptual diagram. FIG. 25 shows a case where an information processing apparatus 241 and a printer 243 are connected to each other via a communication-path 245. The communication path 245 may be wired or wireless.

In this case, the information processing apparatus 241 is, for example, a computer or an image pickup apparatus, such as a video camera or a digital camera, similarly to the information processing apparatus 161 in the first embodiment.

In addition, the information processing apparatus 241 is configured similarly to the information processing apparatus 161 in the first embodiment.

Figure 26:
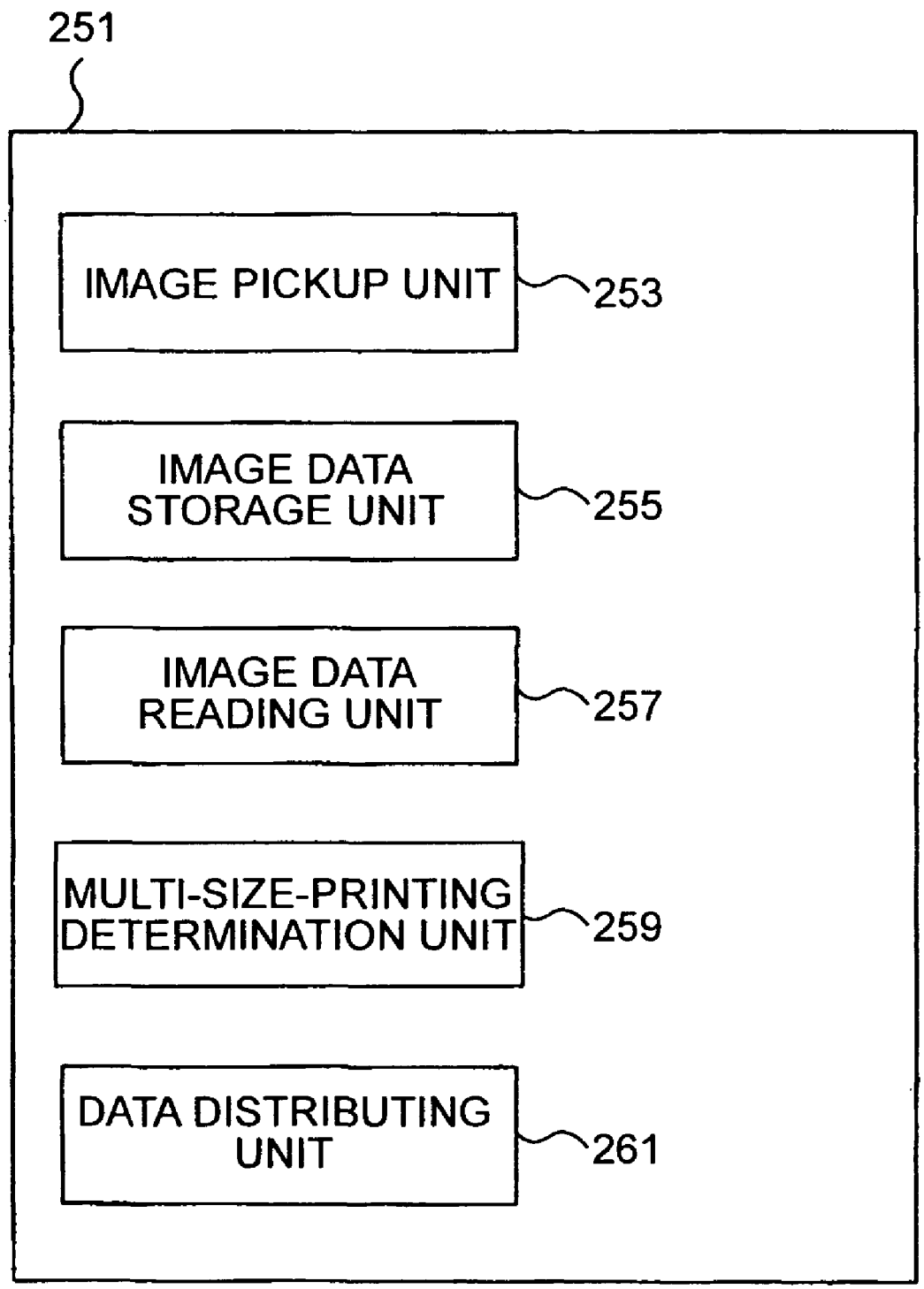
FIG. 26 shows an example of the structure of an image pickup apparatus having an output control function corresponding to multi-size printing.

FIG. 26 shows an example of the structure of an image pickup apparatus 251 functioning as the information processing apparatus 241. The image pickup apparatus 251 includes an image pickup unit 253, an image data storage unit 255 storing image data of a photographed object into a recording medium, an image data reading unit 257, a multi-size-printing determination unit 259, and a data distributing unit 261.

With the output control function in the foregoing embodiments, multi-size printing of an image can be controlled directly by the image pickup apparatus 251.

The image pickup apparatus 251 is not necessarily an apparatus specialized for image pickup. The image pickup apparatus 251 may be any type of image processing apparatus as long as it has an image pickup function.

Figure 27:
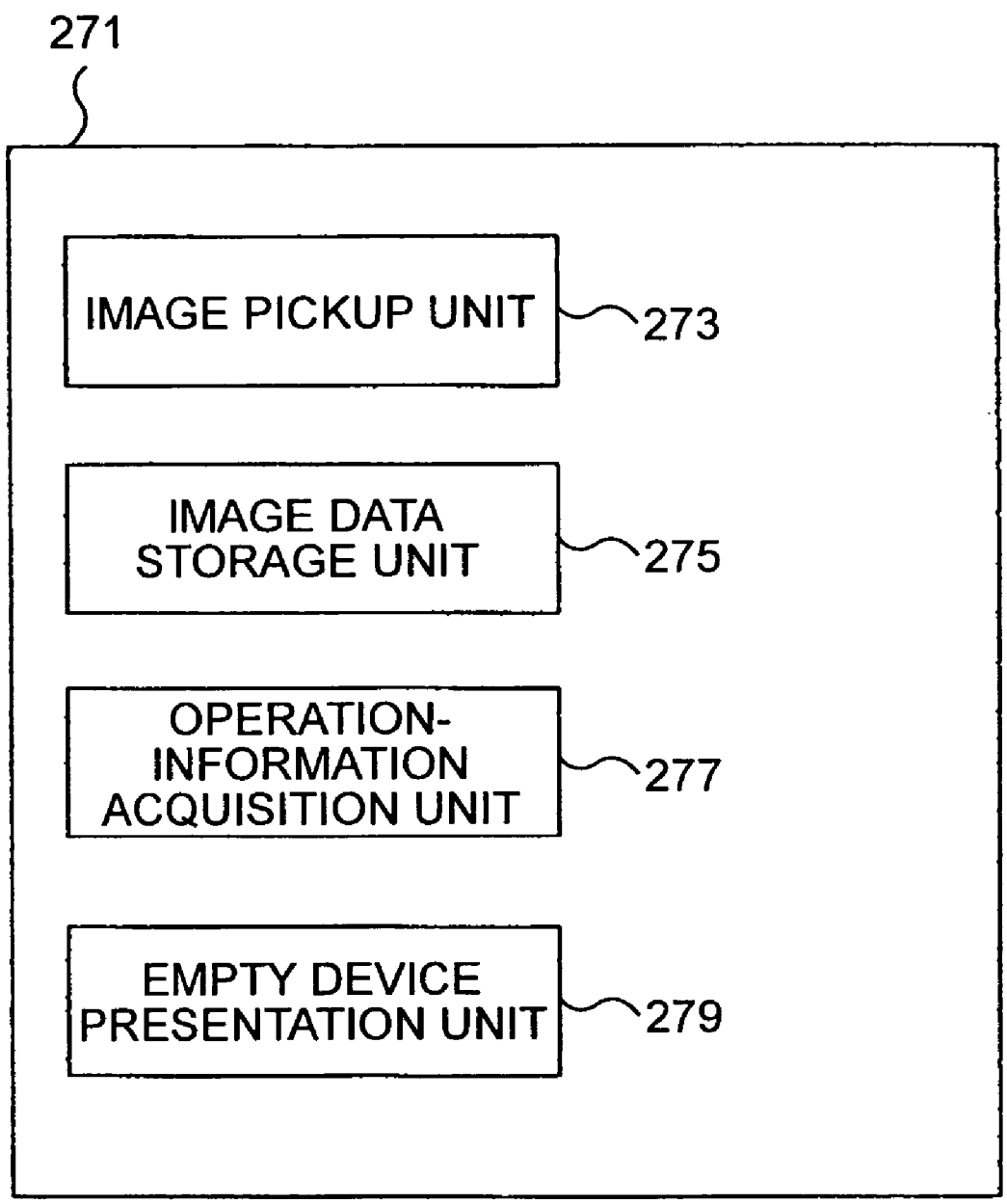
FIG. 27 shows another example of the structure of the image pickup apparatus having the printing-instruction reception function.

FIG. 27 shows another example of the structure of an image pickup apparatus 271. The image pickup apparatus 271 includes an image pickup unit 273, an image data storage unit 275, an operation-information acquisition unit 277 acquiring operation information of a printer device from a printing system, and an empty device presentation unit 279.

With the printing-instruction reception function in the foregoing embodiments, a printing instruction for a printer device that can immediately start printing can be given directly from the image pickup apparatus 271.

Obviously, the image pickup apparatus 271 is not necessarily an apparatus specialized for image pickup. The image pickup apparatus 271 may be any type of image processing apparatus as long as it has an image pickup function.

(d) Although a printing-instruction reception function is provided in the casing of a printer in the second embodiment, obviously, the printing-instruction reception function and the output control function may be provided in a printing system to which an information processing apparatus and a printer are connected via a server, as in the first embodiment.

(e) Although a printing-instruction reception function is provided in the casing of a printer in the second embodiment, obviously, the printing-instruction reception function may be provided in an information processing apparatus (including a server) or a printer that are connected to each other via a network, as in the first embodiment.

Further modifications can be made to the first and second embodiments, as described below, without departing from the scope and spirit of the present invention.

(a) Although a plurality of printer devices is installed in the printing unit 33 in the foregoing embodiments, only one printer device may be provided in the printing unit 33.

(b) Although a printer device is provided for each print size in the foregoing embodiments, a plurality of printer devices may be provided for one print size. For example, four printer devices are provided for L-size printing.

(c) Although a printer device is provided for each print size in the foregoing embodiments, a printer device that is capable of handling a plurality of print sizes may be used. In this case, a plurality of printing cassettes for the respective print sizes is loaded in the printer device.

(d) Although dye-sublimation printer devices are used in the foregoing embodiments, other printing procedures may be used. For example, a thermal transfer printer device, an ink jet printer device, or an electrographic printer device, such as a laser printer device, may be used.

(e) Although a printing-instruction reception function is provided in a kiosk terminal (in other words, a photograph vending machine), which is one type of business printer, in the foregoing embodiments, the printing-instruction reception function may be provided in other business printers or personal printers.

For example, the printing-instruction reception function may be provided in an office printer, a compound machine containing a scanner and a printer, or a home printer.

Such a printer is not necessarily an apparatus specialized for photograph printing. For example, the printer may be capable of printing documents.

(f) Although print data is image data in the foregoing embodiments, the print data may be text data. In this case, for example, an image of a document or the name of a file, instead of a thumbnail image of an image, may be displayed on a detail-setting screen.

Accordingly, multi-size printing of a document can be performed.

(g) Although a printing-instruction reception function is a functional device in the controller 21 in the foregoing embodiments, the functional device may be hardware or software.

A program for realizing the printing-instruction reception function may be stored in a recording medium and distributed.

(h) Various modifications can be made to the foregoing embodiments without departing from the scope and spirit of the present invention. In addition, various modifications and applications can be made in accordance with the description of this specification.

It should be understood by those skilled in the art that various modifications, combinations, sub-combinations and alterations may occur depending on design requirements and other factors insofar as they are within the scope of the appended claims or the equivalents thereof.

What is claimed is:

1. A print data processing apparatus comprising:
   a reception processing unit receiving an instruction for execution of a multi-size printing function, for a plurality of different print data, to output a plurality of print sizes in parallel for each piece of print data, wherein each piece of print data is printed on a separate piece of paper; and
   display unit for displaying screens which instruct users to perform operations, the screens include at least (a) a first screen displaying individual print data setting areas, one for each print data having one selected size, each area including a size-addition button and increment/decrement buttons to select number of copies for the one selected print size and (b) when the size-addition button is selected on the first screen to execute the multi-size printing function, a second screen is displayed to add more than one additional print size for each selected print data and the second screen including increment/decrement buttons to select number of copies for each print size added, wherein the second screen is displayed overlapping the first screen when a user selects the size-addition button on the first screen for the selected print data.

2. The print data processing apparatus according to claim 1, wherein, when the multi-size printing function is executed, the reception processing unit presents to a user all paper sizes handled by a printing unit as candidates to be selected.

3. The print data processing apparatus according to claim 1, wherein:
   when the multi-size printing function is executed, the reception processing unit presents to a user all paper sizes handled by a printing unit as candidates to be selected; and
   the candidates to be selected are presented to the user in accordance with a button operation on a screen for instructing execution of multi-size printing.

4. The print data processing apparatus according to claim 1, wherein, when the multi-size printing function is executed, the reception processing unit presents to a user a paper size other than a paper size that has already been designated, from among all paper sizes handled by a printing unit, as a candidate to be selected.

5. The print data processing apparatus according to claim 1, wherein:
   when the multi-size printing function is executed, the reception processing unit presents to a user a paper size other than a paper size that has already been designated, from among all paper sizes handled by a printing unit, as a candidate to be selected; and
   the candidate to be selected is presented to the user in accordance with a button operation on a screen for instructing addition of a size.

6. The print data processing apparatus according to claim 1, wherein the reception processing unit performs instruction reception processing of multi-size printing for each piece of print data.

7. The print data processing apparatus according to claim 1, wherein the reception processing unit collectively performs instruction reception processing of multi-size printing for all the print data received as objects to be printed.

8. The print data processing apparatus according to claim 1, further comprising:
   an operation-information acquisition unit acquiring operation information on all printer devices constituting a printing unit from the printing unit; and
   an empty device presentation unit explicitly presenting a printer device that is not operating when the instruction for printing is received.

9. The print data processing apparatus according to claim 1, further comprising:
   a size-information acquisition unit acquiring information on a paper size that is usable when the instruction for printing is received, from among all paper sizes handled by a printing unit, from the printing unit; and
   a size-information presentation unit explicitly presenting a paper size that is selectable when the instruction for printing is received in accordance with the information on the paper size acquired from the printing unit.

10. The print data processing apparatus according to claim 9, wherein the size-information presentation unit presents only the paper size that is selectable when the instruction for printing is received, from among all the paper sizes handled by the printing unit, as a candidate to be selected.

11. The print data processing apparatus according to claim 9, wherein the size-information presentation unit indicates in gray a paper size that is not selectable when the instruction for printing is received, from among all the paper sizes handled by the printing unit.

12. The print data processing apparatus according to claim 9, wherein the size-information presentation unit receives selection of only the paper size that is selectable when the instruction for printing is received and invalidates selection of the other paper sizes.

13. The print data processing apparatus according to claim 9, wherein the size-information presentation unit presents the paper size when a user instructs the execution of the multi-size printing function to output a piece of image data in the plurality of print sizes.

14. The print data processing apparatus according to claim 1, further comprising:
a multi-size-printing determination unit determining whether or not multi-size printing is set for the print data; and
a data distribution unit outputting the print data in parallel to a plurality of printer devices constituting a printing unit and prepared for the respective print sizes when the multi-size printing is set.

15. A printer comprising:
a reception processing unit receiving an instruction for execution of a multi-size printing function for a plurality of different print data to output a plurality of print sizes for each piece of print data;
a printing unit printing the plurality of print sizes in parallel in accordance with a printing condition input by a user for each of the plurality of print data, wherein each piece of print data is printed on a separate piece of paper; and
display unit for displaying screens which instruct users to perform operations, the screens include at least (a) a first screen displaying individual print data setting areas, one for each print data having one selected size, each area including a size-addition button and increment/decrement buttons to select number of copies for the one selected print size and (b) when the size-addition button is selected on the first screen to execute the multi-size printing function, a second screen is displayed to add more than one additional print size for each selected print data and the second screen including increment/decrement buttons to select number of copies for each print size added, wherein the second screen is displayed overlapping the first screen when a user selects the size-addition button on the first screen for the selected print data.

16. The printer according to claim 15, further comprising:
a multi-size-printing determination unit determining whether or not multi-size printing is set for the print data; and
a data distribution unit outputting the print data in parallel to a plurality of printer devices constituting the printing unit and prepared for the respective print sizes when the multi-size printing is set.

17. The printer according to claim 15, further comprising:
an operation-information acquisition unit acquiring operation information on all printer devices constituting the printing unit and prepared for the respective print sizes from the printing unit; and
an empty device presentation unit explicitly presenting a printer device that is not operating when the instruction for printing is received.

18. The printer according to claim 15, further comprising:
a size-information acquisition unit acquiring information on a paper size that is usable when the instruction for printing is received, from among all paper sizes handled by the printing unit, from the printing unit; and
a size-information presentation unit explicitly presenting a paper size that is selectable when the instruction for printing is received in accordance with the information on the paper size acquired from the printing unit.

19. A photograph vending machine comprising:
a reception processing unit receiving an instruction for execution of a multi-size printing function for a plurality of different print data to output a plurality of print sizes for each piece of print data;
a printing unit printing the plurality of print sizes in parallel in accordance with a printing condition input by a user for each of the plurality of print data, wherein each piece of print data is printed on a separate piece of paper; and
display unit for displaying screens which instruct users to perform operations, the screens include at least (a) a detail-setting screen displaying individual print data setting areas, one for each print data having one selected size, each area including a size-addition button and increment/decrement buttons to select number of copies for the one selected print size and (b) when the size-addition button is selected on the detail-setting screen to execute the multi-size printing function, a size-addition screen is displayed to add more than one additional print size for each selected print data and the second screen including increment/decrement buttons to select number of copies for each print size added, wherein the size-addition screen is displayed overlapping the detail-setting screen when a user selects the size-addition button on the detail-setting screen for the selected print data.

20. The photograph vending machine according to claim 19, further comprising:
a multi-size-printing determination unit determining whether or not multi-size printing is set for the print data; and
a data distribution unit outputting the print data in parallel to a plurality of printer devices constituting the printing unit and prepared for the respective print sizes when the multi-size printing is set.

21. The photograph vending machine according to claim 19, further comprising:
an operation-information acquisition unit acquiring operation information on all printer devices constituting the printing unit and prepared for the respective print sizes from the printing unit; and
an empty device presentation unit explicitly presenting a printer device that is not operating when the instruction for printing is received.

22. The photograph vending machine according to claim 19, further comprising:
a size-information acquisition unit acquiring information on a paper size that is usable when the instruction for printing is received, from among all paper sizes handled by the printing unit, from the printing unit; and a size-information presentation unit explicitly presenting a paper size that is selectable when the instruction for printing is received in accordance with the information on the paper size acquired from the printing unit.

23. A print data processing method comprising the steps of:

receiving an instruction for execution of a multi-size printing function for a plurality of different print data to output a plurality of print sizes in parallel for each piece of print data, wherein each piece of print data is printed on a separate piece of paper; and displaying screens which instruct users to perform operations, the screens include at least (a) a first screen displaying individual print data setting areas, one for each print data having one selected size, each area including a size-addition button and increment/decrement buttons to select number of copies for the one selected print size and (b) when the size-addition button is selected on the first screen to execute the multi-size printing function, a second screen is displayed to add more than one additional print size for each selected print data and the second screen including increment/decrement buttons to select number of copies for each print size added, wherein the second screen is displayed overlapping the first screen when a user selects the size-addition button on the first screen for the selected print data.

24. The print data processing method according to claim 23, further comprising the steps of:

determining whether or not multi-size printing is set for the print data; and outputting the print data in parallel to a plurality of printer devices constituting a printing unit and prepared for the respective print sizes when the multi-size printing is set.

25. The print data processing method according to claim 23, further comprising the steps of:

acquiring operation information on all printer devices constituting a printing unit from the printing unit; and explicitly presenting a printer device that is not operating when the instruction for printing is received.

26. The print data processing method according to claim 23, further comprising the steps of:

acquiring information on a paper size that is usable when the instruction for printing is received, from among all paper sizes handled by a printing unit, from the printing unit; and explicitly presenting a paper size that is selectable when the instruction for printing is received in accordance with the information on the paper size acquired from the printing unit.

27. A program embodied on a non-transitory computer readable medium for causing a computer to perform processing comprising the steps of:

receiving an instruction for execution of a multi-size printing function for a plurality of different print data to output a plurality of print sizes in parallel for each piece of print data, wherein each piece of print data is printed on a separate piece of paper; and displaying screens which instruct users to perform operations, the screens include at least (a) a first screen displaying individual print data setting areas, one for each print data having one selected size, each area including a size-addition button and increment/decrement buttons to select number of copies for the one selected print size and (b) when the size-addition button is selected on the first screen to execute the multi-size printing function, a second screen is displayed to add more than one additional print size for each selected print data and the second screen including increment/decrement buttons to select number of copies for each print size added, wherein the second screen is displayed overlapping the first screen when a user selects the size-addition button on the first screen for the selected print data.

28. The program according to claim 27 for causing the computer to perform the processing, further comprising the steps of:

determining whether or not multi-size printing is set for the print data; and outputting the print data in parallel to a plurality of printer devices when the multi-size printing is set, wherein output of the print data to a printing unit constituted by the plurality of printer devices prepared for the respective print sizes is controlled.

29. The program according to claim 27 for causing the computer to perform the processing, further comprising the steps of:

acquiring operation information on all printer devices constituting a printing unit from the printing unit; and explicitly presenting a printer device that is not operating when the instruction for printing is received.

30. The program according to claim 27 for causing the computer to perform the processing, further comprising the steps of:

acquiring information on a paper size that is usable when the instruction for printing is received, from among all paper sizes handled by a printing unit, from the printing unit; and explicitly presenting a paper size that is selectable when the instruction for printing is received in accordance with the information on the paper size acquired from the printing unit.

* * * * *